(12) United States Patent
Ellison et al.

(10) Patent No.: US 9,440,875 B2
(45) Date of Patent: *Sep. 13, 2016

(54) GLASS COMPOSITION HAVING HIGH THERMAL AND CHEMICAL STABILITY

(71) Applicant: CORNING INCORPORATED, Corning, NY (US)

(72) Inventors: Adam James Ellison, Corning, NY (US); Timothy James Kiczenski, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/640,429

(22) Filed: Mar. 6, 2015

(65) Prior Publication Data

US 2015/0175474 A1 Jun. 25, 2015

Related U.S. Application Data

(63) Continuation of application No. 13/980,780, filed as application No. PCT/US2012/022519 on Jan. 25, 2012, now Pat. No. 8,993,465.

(60) Provisional application No. 61/435,987, filed on Jan. 25, 2011.

(51) Int. Cl.
| | |
|---|---|
| *C03C 3/087* | (2006.01) |
| *C03C 3/11* | (2006.01) |
| *C03C 3/118* | (2006.01) |
| *C03C 3/112* | (2006.01) |
| *C03C 3/091* | (2006.01) |
| *C03C 3/093* | (2006.01) |

(52) U.S. Cl.
CPC ............... *C03C 3/118* (2013.01); *C03C 3/087* (2013.01); *C03C 3/091* (2013.01); *C03C 3/093* (2013.01); *C03C 3/11* (2013.01); *C03C 3/112* (2013.01)

(58) Field of Classification Search
CPC ......... C03C 3/087; C03C 3/11; C03C 3/118; C03C 3/112; C03C 3/091; C03C 3/093
See application file for complete search history.

(56) References Cited

U.S. PATENT DOCUMENTS

| | | | |
|---|---|---|---|
| 6,417,124 B1 | 7/2002 | Peuchert et al. | 501/66 |
| 6,992,031 B2 | 1/2006 | Naumann et al. | 501/69 |
| 7,535,179 B2 | 5/2009 | Hueber et al. | 313/636 |
| 8,993,465 B2 * | 3/2015 | Ellison | C03C 3/087 501/69 |
| 2005/0096209 A1 | 5/2005 | Kase et al. | 501/56 |
| 2007/0191207 A1 | 8/2007 | Danielson et al. | 501/66 |

FOREIGN PATENT DOCUMENTS

| | | | |
|---|---|---|---|
| CN | 101400614 A | 4/2009 | |
| EP | 0672629 | 9/1995 | ............. C03C 3/085 |
| JP | 1054522 | 2/1998 | |
| JP | 2002029775 | 1/2002 | |
| JP | 2009525942 | 7/2009 | |
| WO | WO2007/095115 | 8/2007 | ............. C03C 3/087 |

* cited by examiner

*Primary Examiner* — Elizabeth A Bolden

(74) *Attorney, Agent, or Firm* — Ryan T. Hardee

(57) ABSTRACT

Described herein are alkali-free, boroalumino silicate glasses exhibiting desirable physical and chemical properties for use as substrates in flat panel display devices, such as, active matrix liquid crystal displays (AMLCDs) and active matrix organic light emitting diode displays (AMO-LEDs). In accordance with certain of its aspects, the glasses possess good dimensional stability as a function of temperature.

20 Claims, 3 Drawing Sheets

GLASS COMPOSITION HAVING HIGH THERMAL AND CHEMICAL STABILITY

CROSS-REFERENCE TO RELATED APPLICATIONS

This is a continuation application and claims the benefit of priority to U.S. application Ser. No. 13/980,780 filed on Jul. 19, 2013, which claims the benefit of priority to PCT Application No. PCT/US12/22519 filed Jan. 25, 2012, which claims the benefit of priority to U.S. Provisional Application Ser. No. 61/435,987 filed on Jan. 25, 2011, the content of which is hereby incorporated by reference.

BACKGROUND

The production of liquid crystal displays such as, for example, active matrix liquid crystal display devices (AMLCDs) is very complex, and the properties of the substrate glass are extremely important. First and foremost, the glass substrates used in the production of AMLCD devices need to have their physical dimensions tightly controlled. The downdraw sheet drawing processes and, in particular, the fusion process described in U.S. Pat. Nos. 3,338,696 and 3,682,609, both to Dockerty, are capable of producing glass sheets that can be used as substrates without requiring costly post-forming finishing operations such as lapping and polishing. Unfortunately, the fusion process places rather severe restrictions on the glass properties, which require relatively high liquidus viscosities.

In the liquid crystal display field, thin film transistors (TFTs) based on poly-crystalline silicon are preferred because of their ability to transport electrons more effectively. Poly-crystalline based silicon transistors (p-Si) are characterized as having a higher mobility than those based on amorphous-silicon based transistors (a-Si). This allows the manufacture of smaller and faster transistors. P-Si displays are at the core of state-of-the-art handheld devices. The p-Si thin film transistor array consumes very low power, permits very fine features (critical for small displays), and provides high brightness.

The process used to make p-Si TFTs invariably includes a thermal excursion to quite high temperature to encourage the silicon to crystallize. In some processes, temperature alone is used to produce crystallization, and in such processes the peak temperatures are very high, very typically greater than 650° C. compared to the 350° C. peak temperatures employed in the manufacture of a-Si transistors. At these temperatures, most AMLCD glass substrates undergo a process known as compaction and will deform excessively unless supported from below. Compaction, also referred to as thermal stability or dimensional change, is an irreversible dimensional change (shrinkage or expansion) in the glass substrate due to changes in the glass' fictive temperature. The magnitude of compaction depends both on the process by which a glass is made and the viscoelastic properties of the glass. In the float process for producing sheet products from glass, the glass sheet is cooled relatively slowly from the melt and, thus, "freezes in" a comparatively low temperature structure into the glass. The fusion process, by contrast, results in very rapid quenching of the glass sheet from the melt, and freezes in a comparatively high temperature structure. As a result, a glass produced by the float process possesses less compaction when compared to glass produced by the fusion process. In the glass product itself, the compaction ultimately may produce poor registry with the color filter and, if large enough, adversely affect device performance. Thus, it would be desirable to minimize the level of compaction in a glass substrate that is produced by a downdraw process. A commercial glass product, Jade® (Corning Incorporated, Corning N.Y.), was developed expressly to address this problem. It has a very high annealing point compared to conventional amorphous silicon substrate glasses, and thus shows low compaction even when reheated above the strain point of conventional amorphous silicon substrates.

While the Jade® product has proven sufficient for many p-Si processes, there is still a demand for even lower levels of compaction and/or the capability of withstanding heat treatments at even higher temperatures, sometimes in excess of 700° C. Annealed low annealing point p-Si substrate glasses can be optimized to provide these lower levels of compaction but their deformation at elevated temperature is only marginally improved with this increased anneal. The Jade® product has better deformation at elevated temperatures than annealed low annealing point glasses but has too much compaction for some applications and may need even more resistance to deformation under the extreme conditions of some newly developed cycles. In order to provide the desired lower compaction in existing processes as well as enabling the development of new higher temperature processes, a glass with an annealing point in excess of 785° C. is desired.

SUMMARY

In accordance with the purposes of the disclosed materials, compounds, compositions, articles, devices, and methods, as embodied and broadly described herein are alkali-free, boroalumino silicate glasses exhibiting desirable physical and chemical properties for use as substrates in flat panel display devices, such as, active matrix liquid crystal displays (AMLCDs) and active matrix organic light emitting diode displays (AMOLEDs). In accordance with certain of its aspects, the glasses possess good dimensional stability as a function of strain point. Specifically, the glasses described herein are fusion-compatible glasses with an anneal point in excess of 785° C., with a temperature at 200 poise of 1730° C. or less, with a density less than 2.65 g/cc, and with etch rates in fluoride-based mineral acids within 10% of the range exhibited by conventional a-Si substrate materials. Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying figures, which are incorporated in and constitute a part of this specification, illustrate several aspects described below.

DETAILED DESCRIPTION

Figure 1:
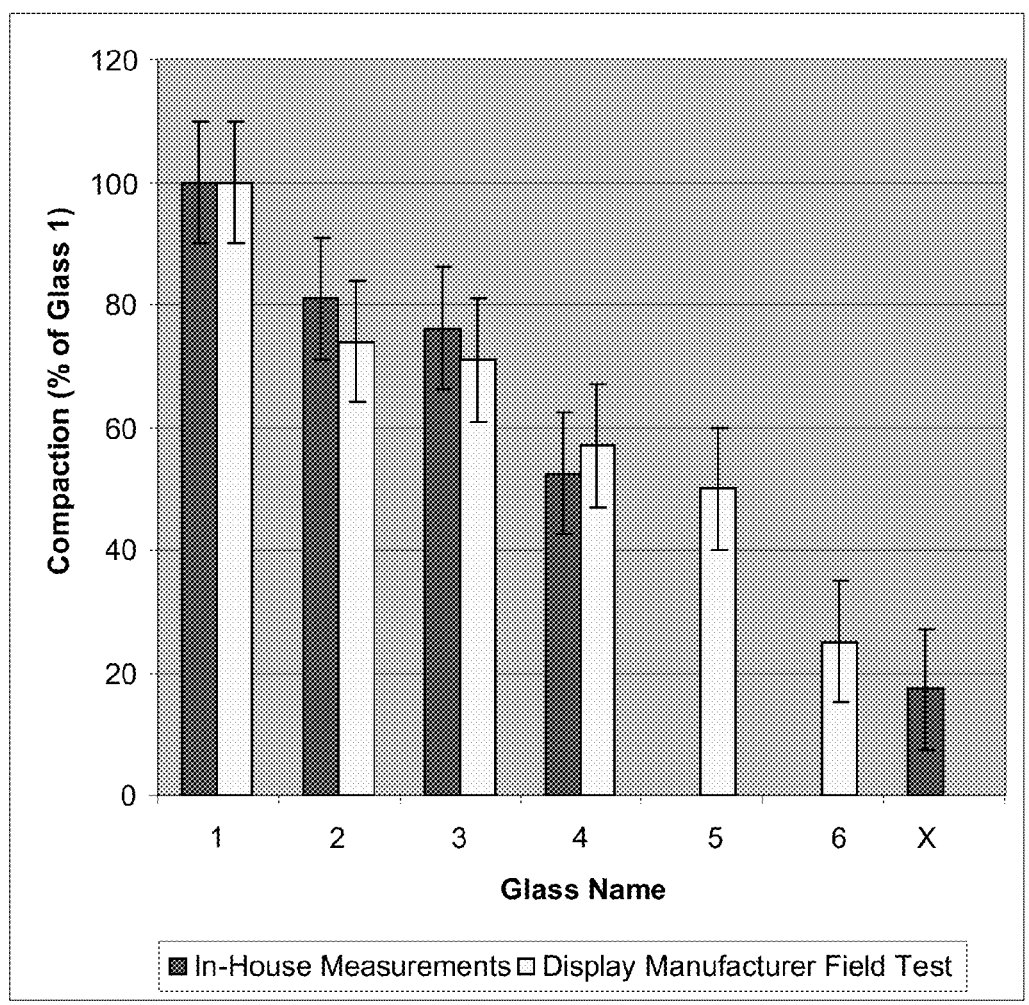
FIG. 1 is a comparison of the compaction of a glass typical of this invention with typical p-Si glasses.

The materials, compounds, compositions, articles, devices, and methods described herein may be understood more readily by reference to the following detailed description of specific aspects of the disclosed subject matter and the Examples included therein and to the Figures.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

Throughout the description and claims of this specification the word "comprise" and other forms of the word, such as "comprising" and "comprises," means including but not limited to, and is not intended to exclude, for example, other additives, components, integers, or steps.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers or prepared by methods known to those skilled in the art.

Also, disclosed herein are materials, compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Reference will now be made in detail to specific aspects of the disclosed materials, compounds, compositions, articles, and methods, examples of which are illustrated in the accompanying Examples and Figures.

Described herein are alkali-free glasses and methods for making the same that possess high strain points and, thus, good dimensional stability (i.e., low compaction). A high strain point glass can prevent panel distortion due to compaction/shrinkage during thermal processing subsequent to manufacturing of the glass.

The compositions represented by ranges of the present disclosure comprise $SiO_2$, $Al_2O_3$, $B_2O_3$, MgO, CaO, SrO and BaO, and fining agents may include tin oxide ($SnO_2$), iron oxide ($Fe_2O_3$), cerium oxide ($CeO_2$) various halides (principally F, Cl and Br), $As_2O_3$ or $Sb_2O_3$. In one embodiment, the composition comprises an alkali-free glass comprising in mol percent on an oxide basis:

$70 \leq SiO_2 \leq 74.5$ $10.5 \leq Al_2O_3 \leq 13.5$ $0 \leq B_2O_3 \leq 2.5$ $3 \leq MgO \leq 7$ $3 \leq CaO \leq 7$ $0 \leq SrO \leq 4$ $1.5 \leq BaO \leq 6$ $0 \leq SnO_2 \leq 0.3$ $0 \leq CeO_2 \leq 0.3$ $0 \leq As_2O_3 \leq 0.5$ $0 \leq Sb_2O_3 \leq 0.5$ $0.01 \leq Fe_2O_3 \leq 0.08$ $F+Cl+Br \leq 0.4$ wherein
 a) $1.05 \leq RO/Al_2O_3 \leq 1.7$
 b) $0.2 \leq MgO/RO \leq 0.45$
where $Al_2O_3$, MgO, CaO, SrO and BaO represent the mol percents of the representative oxide components and RO=MgO+CaO+SrO+BaO. In another embodiment, the MgO/RO is $0.29 \leq MgO/(MgO+CaO+SrO+BaO) \leq 0.39$.

In one embodiment, the compositions are further constrained as follows:

$$(SiO_2+Al_2O_3)/(1-B_2O_3/100)=86.97-0.713*(MgO+CaO+SrO+BaO-Al_2O_3)/(1-B_2O_3/100)\pm 0.8$$

In another embodiment, glasses within the disclosed ranges are substantially free of arsenic oxide ($As_2O_3$) or antimony oxide ($Sb_2O_3$) such that the concentration of either or both of these oxides is less than 0.05 wt %. When this is the case, it may be preferable to add other multivalent oxides such as $SnO_2$, $Fe_2O_3$ and/or $CeO_2$ to ensure a minimum number of gaseous inclusions in the final glass.

In one embodiment, the glasses of the present disclosure exhibit a density less than 2.65 g/cc. In another embodiment the glasses exhibit densities of less than 2.6 g/cc.

Compositions falling within the above defined ranges are shown in Table 1.

The temperature corresponding to 200 poise is often used as a rough guideline for the appropriate melting temperature of a glass. The 200 poise temperatures of the glasses in Table 1 are, for the most part, very high, generally greater than about 1670° C. A surprising result obtained for the inventive glasses is that at the low $B_2O_3$ contents of the inventive ranges, the melting rate of the most refractory batch materials, notably $SiO_2$ (or sand), is accelerated relative to glasses with higher $B_2O_3$ contents. Because of this, and because of the comparatively low resistivity of these glasses compared to glasses with higher $B_2O_3$ contents, when the inventive glasses are melted in a joule-boosted CU melter with a platinum finer and optical stirrer, excellent glass quality is obtained for melter temperatures anywhere between about 200 and 450 poise.

The temperature corresponding to 35,000 poise viscosity is regarded as a metric for the temperature at which glass is delivered to the trough of the isopipe. It is generally desirable that this temperature be as low as possible to minimize creep of the isopipe refractory over time. The inventive glasses generally have 35,000 poise temperatures between about 1280° C. and 1345° C., but at the high end of this range, it might be necessary to use a special refractory for the isopipe to obtain acceptable isopipe lifetime. Therefore, in one embodiment, the inventive glasses have 35,000 poise temperatures less than 1320° C., and in another embodiment, less than 1310° C.

Fusion-drawn glass has a high fictive temperature, and this results in a substantial disequilibrium of the glass structure when reheated to temperatures close to the annealing point. If as-drawn glass is to be used in a p-Si process, the only means to minimize compaction are to anneal the glass at a temperature close to the annealing point, and thereby partially or entirely structurally relax the glass, or to increase the anneal point of the glass such that the rate of structural relaxation is reduced, and the magnitude of structural relaxation in the p-Si process is minimized. Unfortunately, the annealing point required to produce low levels of compaction in p-Si processes depends upon the details of the process, and is difficult to predict without running glasses with a variety of annealing points through the thermal cycle of interest. In general, to provide a consistent product to customers with different p-Si processes, the best means to minimize compaction is to make the annealing point as high as reasonably achieved consistent with manufacturability and other customer-related constraints. The inventive glasses have annealing temperatures greater than about 790° C., greater than any commercially-available substrate for AMLCD applications, and thus are great enough to produce minimal compaction in p-Si processes. In another embodiment, the annealing temperature exceeds 800° C. In yet another embodiment the annealing temperature exceeds 810° C. In another embodiment the annealing temperature exceeds 815° C.

Each oxide constituent in the inventive glasses serves an important purpose. Silica, or $SiO_2$, is the primary glass forming oxide, and contributes viscosity to the molten glass. For a given liquidus temperature, increasing viscosity serves to increase liquidus viscosity, and thus to improve compatibility with the fusion process. However, if viscosity becomes too high, then melting-related defects such as fining bubbles may appear, and erosion of refractories and degradation of platinum may become too extreme to permit long-term manufacturing in a continuous process. Furthermore, as silica increases, the liquidus temperature may increase due to increasing stability of cristobalite, a crystalline polymorph of $SiO_2$ that is an undesirable devitrification phase in a continuous process. Compared to every oxide except boron oxide ($B_2O_3$), $SiO_2$ decreases density and coefficient of thermal expansion, and relative to $B_2O_3$ it improves durability. $SiO_2$ ranges between 70 and 74.5 mol % in the inventive glasses.

Aluminum oxide, or $Al_2O_3$, also serves as a glass former in the inventive glasses. Like $SiO_2$, it contributes viscosity, and when carefully balanced against $SiO_2$ concentration and the relative and absolute concentrations of alkaline earths, can be used to reduce liquidus temperature, thus enhancing liquidus viscosity. An increase in $Al_2O_3$ relative to every oxide except $SiO_2$ results in improved durability in the kinds of acid-based etchants commonly used to etch display glasses in amorphous-silicon-based etching processes. Like $SiO_2$, an increase in $Al_2O_3$ relative to the alkaline earths generally results in decreased density, decreased coefficient of thermal expansion, and improved durability. Of particular importance, increasing $Al_2O_3$ at the expense of any component save $SiO_2$ will generally increase the anneal point, and thus a minimum amount of $Al_2O_3$ is required to obtain the high anneal points required for the p-Si application. Because of the need to balance $Al_2O_3$ against other oxides, the full range of $Al_2O_3$ content of the inventive glasses is between 10.5 and 13.5 mol %.

Boron oxide, or $B_2O_3$, is also a glass-forming oxide, and is used to reduce viscosity and, more importantly, to reduce liquidus temperature. In general, an increase in $B_2O_3$ of 1 mol % decreases the temperature at equivalent viscosity by 10-14° C., depending on the details of the glass composition and the viscosity in question. However, $B_2O_3$ can lower liquidus temperature by 18-22° C. per mol %, and thus has the effect of decreasing liquidus temperature more rapidly than it decreases viscosity, thereby increasing liquidus viscosity. As one moves to extremely low $B_2O_3$ contents, keeping all other oxides within their respective ranges, it generally becomes increasingly difficult to obtain a liquidus viscosity as high as 130 kpoise, or more preferably greater than 170 kpoise, a prerequisite for compatibility with the fusion process as practiced today. If one were to increase boron oxide concentration at the expense of other glass components, CTE and density will generally decrease, but anneal point will decrease sharply, by as much as 14° C. per mol %, which is highly detrimental for p-Si substrate applications. On the other hand, relative to the other components that can reduce viscosity, principally the alkaline earth oxides, increasing boron oxide actually improves durability in fluoride-containing acids, making the glass more compatible with etching processes designed for amorphous silicon substrate glasses. For these reasons, $B_2O_3$ is preferably kept between 0 and 2.5 mol %. In one embodiment, the glass is essentially free of $B_2O_3$.

A surprising discovery is that glasses with comparatively low liquidus temperatures—and hence high liquidus viscosities—can be obtained in boron-free glasses. As noted above, boron oxide decreases liquidus temperature more rapidly than it decreases viscosity, so in general additions of $B_2O_3$ improve liquidus viscosity. Furthermore, boron tends to reduce the composition dependence of liquidus temperature, such that a change in the relative concentration of a particular oxide in a boron-free glass will tend to cause a larger change to liquidus temperature than a change in a boron-containing glass. The unexpected result described herein is that for a narrow range of oxides other than $B_2O_3$, low liquidus temperatures can be obtained, and as these glasses are very viscous for reasons stated above, the corresponding liquidus viscosities can be very high and appropriate for the fusion process. For example, the liquidus viscosities of the glasses in Table 1 are about 130,000 poise or more, thus making them compatible with the fusion process. In addition, the fusion process operates over a particular range of viscosity: glass is delivered to the trough of the isopipe at a viscosity corresponding to 20,000-35,000 poise, and glass leaves the root of the isopipe in the form of a viscous ribbon at a viscosity corresponding to 100,000 poise or more. At the very high delivery temperatures of the inventive glasses, the rate of radiative heat loss is greater per unit area than for less viscous glasses simply because a substantial fraction of the black body radiation of the glass is at visible and near-infrared wavelengths, at which wavelengths the glass is substantially transparent. Therefore, practical implementation of the inventive glasses in the fusion process may require high liquidus viscosities compared to those that might otherwise work for amorphous silicon substrate glasses. Thus, in one embodiment, the glass composition has a liquidus viscosity of at least 170,000 poise.

Alkaline earth oxides, MgO, CaO, SrO and BaO, are essential constituents for manufacturing. Like $B_2O_3$, increasing alkaline earths relative to $SiO_2$ or $Al_2O_3$ always decreases the viscosity of a glass melt at fixed temperature. Since high temperature is the main factor limiting the lifetimes of glass tanks and forming equipment, it is always desirable to reduce melting and forming temperatures as much as possible consistent with delivering an appropriate suite of glass properties to a customer. Unlike $SiO_2$, $Al_2O_3$ and $B_2O_3$, increases in alkaline earths relative to the glass forming components generally degrade properties that are important for p-Si applications: CTE and density generally increase as alkaline earth oxides increase relative to $SiO_2$, $Al_2O_3$ and $B_2O_3$, anneal point generally decreases, and durability moves increasingly far from standard amorphous silicon substrate glasses. The only final glass properties that benefits from higher alkaline earth concentration is Young's modulus, and for some combinations of alkaline earth increases, specific modulus. Young's modulus determines the stiffness of a sheet of glass, and thus making it as high as possible is valuable for glass handling. At fixed temperature, the sag of a sheet of glass with widely spaced supports beneath it is dictated by the specific modulus, or the ratio of Young's modulus and density. High alkaline earth concentrations generally increase density, and so work against the expected increase in Young's modulus. However, MgO and CaO increase density much more slowly than the large alkaline earths, Sr and Ba, and thus the relative proportions of the alkaline earths can be manipulated to obtain an optimal combination of Young's modulus and density, consistent with fusion compatibility. In one embodiment, the specific modulus is greater than 30 GPa $cm^3$/gm. In another emdodiment, the specific modulus is greater than 31 GPa $cm^3$/gm. In yet another embodiment, the specific modulus is greater than 31.5 GPa $cm^3$/gm.

Mixtures of alkaline earths are also required to obtain low liquidus temperatures. The reasons behind this are complex. Without wishing to be bound by theory, the inventive ranges for the various alkaline earths have the effect of putting two or more crystalline phases on the liquidus for most glasses within the inventive ranges, one of which is cristobalite ($SiO_2$), and one of which is an alkaline earth aluminosilicate. In barium-rich glasses, the alkaline earth aluminosilicate is often hexacelsian and solid solutions therein, expressed approximately as $Ba_{1-x-y}Sr_xCa_yMg_zAl_{2-z}Si_{2+z}O_8$, where x, y and z are generally less than 0.5. In glasses with low barium concentrations, and thus correspondingly high CaO+SrO concentrations, the alkaline earth aluminosilicate is often anorthite or solid solutions therein, expressed approximately as $Ca_{1-x-y}Sr_xBa_yAl_2Si_2O_8$. For Mg-rich compositions, the liquidus phase is sometimes cordierite or solid solutions therein, approximately $Mg_2Al_4Si_5O_{18}$. The best liquidus temperatures are generally obtained when two or more different aluminosilicate phases and cristobalite are on or close to the liquidus temperature. The relative competition of each phase for glass constituents has the effect of destabilizing other phases, and thus reduces not only the liquidus temperature, but the tendency to devitrify when undercooled in a manufacturing process.

At a fixed level of alkaline earth oxides, melting and forming temperatures are generally reduced when Ba, Sr or Ca is replaced with Mg. This is particularly important when (MgO+CaO+SrO+BaO)/$Al_2O_3$ (also referred to as RO/$Al_2O_3$) is close to 1.0, as their high melt temperatures may make them almost impossible to melt. However, MgO is a participant in hexacelsian and cordierite, and at low (MgO+CaO+SrO+BaO)/$Al_2O_3$ may stabilize mullite. Therefore, MgO needs to be confined to a narrow range of the total alkaline earth oxide concentration to obtain the best balance of viscosity and liquidus temperature: the molar ratio MgO/(MgO+CaO+SrO+BaO) is preferably kept in the range 0.2 to 0.45. In another embodiment this molar ratio is kept in the range of 0.29 to 0.39. In yet another embodiment, this molar ratio is kept in the range of 0.31 to 0.35.

The alkaline earth oxide with the greatest beneficial impact on liquidus temperature is barium oxide, BaO. Unfortunately, it also has the effect of increasing melting and delivery temperatures when substituted for any other alkaline earth oxide, and compromises final glass properties such as density, CTE and anneal point more so than any other alkaline earth oxide. Strontium oxide, SrO, can be increased at the expense of barium to offset some of these deleterious effects, but with much diminished benefit to liquidus temperature. Because hexacelsian is substantially a barium-strontium aluminosilicate, with comparatively low CaO and BaO, it is generally desirable to have CaO concentrations comparable to the combined concentration of BaO+SrO. As a result of these considerations, the inventive glass will have BaO between 1.5 and 6 mol %, SrO between 0 and 4 mol %, and CaO between 3 and 7 mol %. Compositions within these limits have attractive physical properties and liquidus viscosities suitable for down draw processes such as the fusion process.

Even if the melting temperature is comparatively low, the details of the melting equipment may make it difficult to clear gaseous inclusions from a glass melt. Those that remain appear as defects in the final ware. P-Si TFT manufacturers are extremely sensitive to defects that distort the surface of a sheet of glass, and since one cannot predict where a gaseous inclusion will end up relative to the surface of a sheet, gaseous inclusions must be avoided at all cost. Furthermore, for processing simplicity, TFT manufacturers often seek to have color filter glass made from the same substrate material used in the TFT manufacturing process, in which case gaseous inclusions can block pixels, thereby compromising performance of the entire device. To clear gaseous defects from the glass melt before it is made into sheet, it is conventional to add fining agents Fining agents are multivalent cations or halides that release gas at high temperature. Exemplary multivalent fining agents include, but are not limited to, $As_2O_3$, $Sb_2O_3$, $SnO_2$, and $Fe_2O_3$. Waste streams containing arsenic and antimony are considered hazardous materials in some countries, and for this reason is may be desirable to limit their concentrations in the inventive glass. In a preferred embodiment of the inventive glasses, $As_2O_3$, $Sb_2O_3$, or combinations thereof are kept at a level of 500 ppm (0.05 wt %) or less.

Halogens that find use as fining agents include F, Cl and Br. Waste streams that contain halogens may also be regarded as hazardous materials in some countries, and their release during melting processes can cause excessive corrosion of steel ductwork and supports. On the other hand, melt systems can be designed to safely handle off-gas of halogens, and various choices of raw materials can be used to influence their retention in the final glass. Halogens are typically added as stable salts, which may include, but are not limited to, simple salts and hydrated salts of the alkaline earths or aluminum, such as $MgF_2$, $CaF_2$, $SrF_2$, $BaF_2$, $MgCl_2$, $CaCl_2$, $SrCl_2$, $BaCl_2$, $MgCl_2.4H_2O$, $CaCl_2.4H_2O$, $SrCl_2.4H_2O$, $BaCl_2.4H_2O$, $MgBr_2$, $CaBr_2$, $SrBr_2$, $BaBr_2$, $MgBr_2.4H_2O$, $CaBr_2.4H_2O$, $SrBr_2.4H_2O$, $BaBr_2.4H_2O$, $AlCl_3$, $AlCl_3.6H_2O$, and other forms familiar to those skilled in the art of raw material selection. Fining is generally optimized at a relatively low level of halogen addition, and thus the inventive glasses have F+Cl+Br concentrations between 0 and 0.4 mol %. In a preferred embodiment, F+Cl+Br is less than 200 ppm, or 0.02 wt %.

FIG. 1 demonstrates a comparison of a glass typical of this invention (X) with typical p-Si glasses. Compaction is measured relative to a base composition 1 in both an internal compaction measurement and in a display manufacturing cycle, where 50% of 1 is considered an acceptable level of compaction and less than 25% of 1 is preferable. Glasses 1, 2, and 3 have been put through the display manufacturing process as well as our the inventor's simulated internal tests and are included to demonstrate the transparency of the internal simulation with actual display maker's feedback. Glass 4 is Corning's Jade® composition and Glass 5 is a typical annealed p-Si composition, both showing acceptable levels of compaction. Glass 6 is a "more annealed" p-Si glass demonstrating lower compaction relative to the "typical" Glass 5. It is clear that the glasses in this invention (typified by glass X) have comparable, if not superior, compaction performance than either annealed p-Si glass and clearly superior compaction relative to Jade®.

Figure 2:
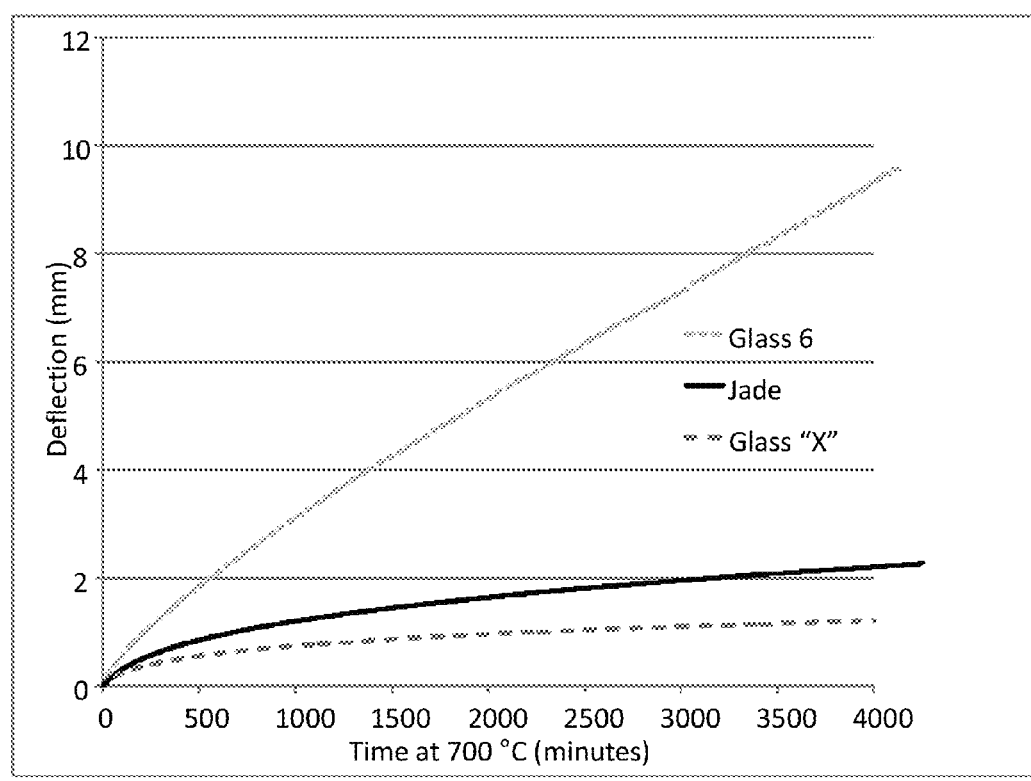
FIG. 2 shows thermal sag (measured as "Deflection" in the y-axis) at 700° C. of commercially available p-Si glasses relative to glasses typical of this invention. It is clear the GBII glass has superior sag behavior at 700° C. than either other p-Si glass, thereby enabling higher temperature thermal cycles in customers' processes.

FIG. 2 demonstrates thermal sag (measured as "Deflection" in the y-axis) at 700° C. of typical p-Si glasses (Glass 6 and Jade®) relative to glasses typical of this invention ("X"). It is clear the X glass has superior sag behavior at 700° C. than either other p-Si glass, thereby enabling higher temperature thermal cycles for use in a display manufacturer's process.

Figure 3:
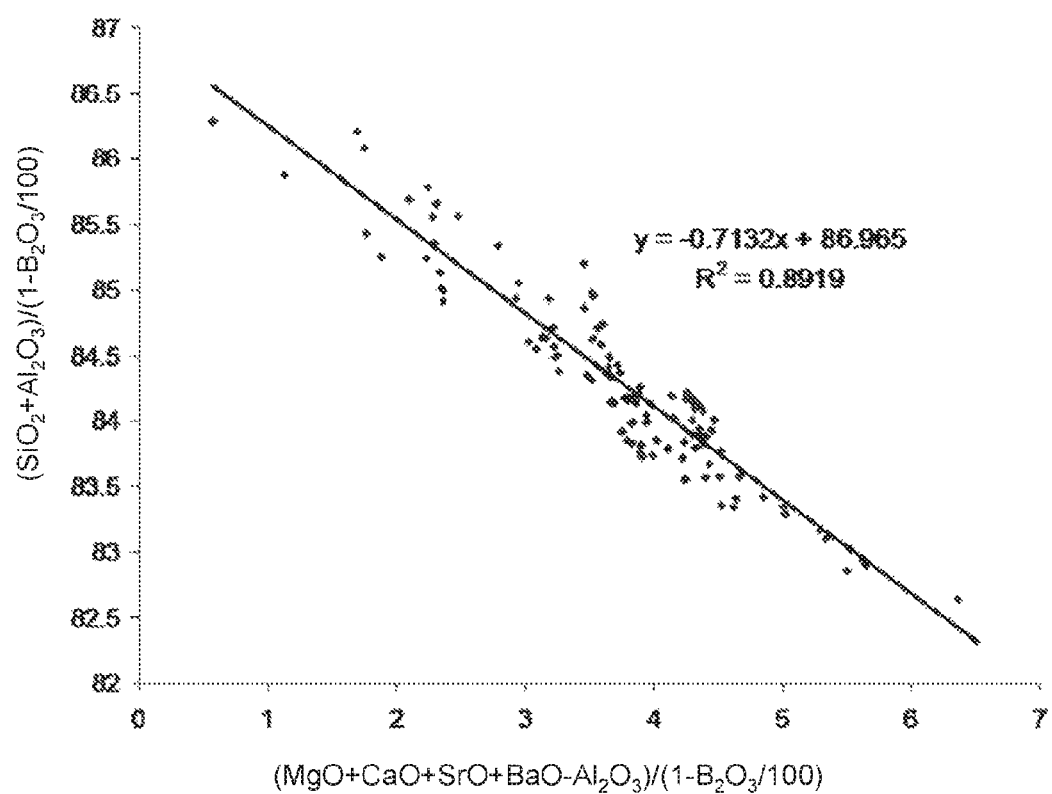
FIG. 3 illustrates the $(SiO_2+Al_2O_3)/(1-B_2O_3/100)$ vs. $(RO-Al_2O_3)/(1-B_2O_3/100)$, in mole-% for glasses of the present disclosure.

FIG. 3 demonstrates an interesting relationship that was observed with respect to the ratio of the $SiO_2+Al_2O_3$ content to $1-B_2O_3$ content and the $RO-Al_2O_3$ content. Many of the advantageous compositions of the present invention were located on the line y=0.7132x+86.965, as demonstrated graphically in FIG. 3. Put another way, in one embodiment, the glasses of the present invention fall within the following relationship: $(SiO_2+Al_2O_3)/(1-B_2O_3/100)=86.97-0.713*(MgO+CaO+SrO+BaO-Al_2O_3)/(1-B_2O_3/100)\pm0.8$.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Table 1 shows an example of an exemplary inventive glass composition based from to Example 16 in Table 2, and a particular selection of raw materials for making it. As is known to those skilled in the art of glass manufacture, the particular choice of raw materials does not impact the final glass composition as the original raw materials are transformed into a single, uniform glass by the melting process. However, the actual choice of raw materials may be different than indicated in light of the particular requirements imposed by the limitations of a particular melting system, or by the cost of the raw materials, or both.

The primary source of $SiO_2$ is sand. The sand can be obtained from one or more of a variety of sources, including sand deposits (beaches or dunes), sandstone, quartzite, or other sources known to those skilled in the art of raw material selection. Sand is often the primary source of alkali contamination in what would otherwise be alkali-free glasses, and therefore a careful selection of source material may be important to minimize this important contaminant. The size of the sand particles may influence the rate of melting, and in particular large sand grains may fail to melt completely, appearing in the wear as a knot or stone. To avoid this, it is generally preferable for more than 90% of all sand grains to pass through a standard #80 U.S. standard mesh size. Alumina itself is generally the least expensive raw material to add $Al_2O_3$ to a glass, but other materials such as the aluminosilicate kaolin or hydrous forms of alumina or polymorphs of $Al_2O_3$ can be used instead when raw material costs are less important.

While Example 16 does not intentionally contain $B_2O_3$, other examples do. $B_2O_3$ can be batched as boric anhydride (approximately 94+% $B_2O_3$, the balance being mostly $H_2O$) or boric acid, approximately $B(OH)_3$.

MgO is generally added as its oxide, while the other alkaline earths are typically batched as carbonates. Suitable carbonate sources for CaO include limestone and precipitated calcium carbonate (a refined limestone product). MgO can be batched with CaO in the form of dolomite, though this may also increase the amount of iron in the glass, and so may be undesirable as compared to a more predictable pure iron source. Most of the strontium and barium will generally be added as carbonates obtained by industrial chemical processes. However, to keep the batch adequately oxidized, it is generally desirable to include a nitrate source as well. Strontium nitrate is indicated in the batch, but barium nitrate will work just as well. In both cases, it is generally desirable to batch no more than about 1 mol % of the alkaline earth oxide as nitrates to reduce $NO_x$ emissions, but in other ways nitrates may assist melting, so the exact amount that will work best is generally the subject of trial-and-error investigation.

$SnO_2$ is included in its usual role as a fining agent. More $SnO_2$ generally equates to improved fining capacity, but as it is a comparatively expensive raw material, it is desirable to add no more than is required to drive gaseous inclusions to an appropriately low level. The $SnO_2$ level of the inventive glass is preferably between 0.02 and 0.3 mol %.

A low amount of $ZrO_2$ (zirconia) is included in this example. It serves no practical role in the melting or fining behavior of the glass, and imparts no interesting properties at such a low level. It is useful to include it in a laboratory-scale batch, however, because it will be introduced by contact of hot glass with zirconia-based refractory materials in the melter, and thus monitoring its level in the glass may be important to judging the rate of tank wear over time. A typical amount of ZrO in the final glass of one embodiment is less than 0.05 mol %. In another embodiment, the amount of ZrO is less than 500 ppm.

The batch shows a low level of iron. Some iron is all but unavoidable due to contamination introduced by raw materials, especially sand and typical sources of MgO. Iron may also be added to benefit fining, hydrogen permeation, or both. If deliberately added, iron oxalate is a particularly useful raw material, but other compounds of iron can be employed as well. Iron can impart color to the glass if it becomes too oxidized, and so the level of iron is preferably between 0.01 and 0.08 mol % to obtain the best balance between gaseous inclusion management and excessive color.

A significant amount of water accompanies boric acid and sand, and a significant amount of carbon dioxide accompanies the carbonate raw materials. $CO_2$ is sparingly soluble in glass, so most of it is lost in the earliest stages of melting, and that which is trapped in gaseous inclusions is generally moved by action of the fining agent, e.g., $SnO_2$ in the present example. A significant level of water may be retained in the glass, however, in the form of dissolved $OH^-$ ions. This results in a measurable $OH^-$ vibrational band near 3600 $cm^{-1}$ in the near infrared. The intensity of this band above background through a 1 mm thick path length is referred to as $\beta_{OH}$. It generally ranges from as low as 0.2 to as high as 0.7 in conventional amorphous silicon substrate glasses. Dissolved $OH^-$ has a large impact on the annealing point for alkali-free glasses, and therefore it is desirable to keep $OH^-$ as low as reasonably achievable for any given glass. Conventional electric-boost melters generally employ burners above the glass surface that generate a high water partial pressure and result in higher levels of water incorporation into the glass. Halides can be used to reduce the retained water level, and boosting the power delivered via electrodes and reducing the power delivered via burners can also help. Likewise, selecting a comparatively dry sand can produce enough of a change in dissolved $OH^-$ to significantly impact annealing point. $\beta_{OH}$ for the inventive glass is less than 0.55, in one embodiment, less than 0.5 in another embodiment, and less than 0.45 in yet another embodiment to maximize the annealing point of the final glass.

While the actual composition and the choice of raw materials in this example is quite specific, it will be obvious to one skilled in the art that alternative raw materials can be used to obtain the same final glass composition, and thus a particular set of raw materials must be selected so as to be best suited for a given melting/fining/forming process. Any other set of raw materials that results in an equivalent composition will therefore produce a glass that satisfies the basic requirement of high annealing point, low density, low CTE, and high durability required for low-temperature polysilicon applications.

Further and although the intended use for the disclosed glasses is in p-Si applications, it should be noted that the glasses may also be considered for a-Si, color filter substrate or other applications where the disclosed properties may be deemed advantageous.

TABLE 1

| | | mol % | batch weight (g) |
|---|---|---|---|
| $SiO_2$ | sand | 71.86 | 596.99 |
| $Al_2O_3$ | alumina | 11.72 | 174.35 |
| MgO | magnesia | 5.17 | 30.36 |
| CaO | limestone | 5.59 | 84.65 |
| SrO | strontium carbonate | 1.42 | 28.45 |
| BaO | barium carbonate | 4.05 | 119.78 |
| $SnO_2$ | tin (IV) oxide, 10% C.B. | 0.15 | 33 |
| $Fe_2O_3$ | iron oxalate 10% C.B. | 0.02 | 5.349 |
| $ZrO_2$ | zirconium oxide 20% C.B. | 0.02 | 2.02 |

Example

Preparation of a Test Sample

TABLE 2 sets forth exemplary glass compositions in mol percent, as calculated on an oxide basis from the glass batches. These example glasses were prepared by melting 1,000-25,000 gram batches of each glass composition at a temperature and time to result in a relatively homogeneous glass composition, e.g. at a temperature of about 1625° C. for a period of about 4-16 hours in platinum crucibles. Also set forth are relevant glass properties for each glass composition, determined on the glasses in accordance with techniques conventional in the glass art. Thus, the linear coefficient of thermal expansion (CTE) over the temperature range 0-300° C. is expressed in terms of $\times 10^{-7}/°$ C., the softening point (Soft. Pt.), and the annealing point (Ann Pt.), and strain point (Str. Pt.) are expressed in terms of ° C. These were determined from fiber elongation techniques (ASTM references E228-85, C338, and C336, respectively). The density (Den.), in terms of $g/cm^3$, was measured via the Archimedes method (ASTM C693).

The 200 poise temperature (Melt. Temp., ° C.) (defined as the temperature at which the glass melt demonstrates a viscosity of 200 poises [20 Pa.s]) was calculated employing the Fulcher equation fit to the high temperature viscosity data (measure via rotating cylinders viscometry, ASTM C965-81). The liquidus temperature (Liq. Temp.) of the glass was measured using the standard liquidus method. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. The liquidus viscosity (Liq. Visc., in poises) was determined from this temperature and the coefficients of the Fulcher equation.

The remainder of properties listed in Table 2 are achieved through standard tests that are well known to those of skill in the industry.

TABLE 2

| Example | 1 | 2 | 3 | 4 | 5 | 6 | 7 |
|---|---|---|---|---|---|---|---|
| $SiO_2$ | 70.75 | 72.33 | 72.19 | 71.68 | 73.11 | 71.75 | 71.99 |
| $Al_2O_3$ | 11.96 | 11.85 | 11.36 | 11.46 | 11.6 | 12.17 | 11.59 |
| $B_2O_3$ | 1.23 | 0 | 1.55 | 1.6 | 0 | 0 | 0 |
| MgO | 5.88 | 4.92 | 4.73 | 4.44 | 4.81 | 5.93 | 5.51 |
| CaO | 5.3 | 5.16 | 5.22 | 5.37 | 5.19 | 5.28 | 5.41 |
| SrO | 2.04 | 3.11 | 1.87 | 2.44 | 1.35 | 2.1 | 1.18 |
| BaO | 2.68 | 2.46 | 2.95 | 2.81 | 3.81 | 2.61 | 4.16 |
| $SnO_2$ | 0.11 | 0.12 | 0.12 | 0.15 | 0.12 | 0.11 | 0.11 |
| $Fe_2O_3$ | 0.02 | 0.02 | 0.01 | 0.02 | 0.01 | 0.02 | 0.03 |
| $ZrO_2$ | 0.02 | 0.02 | 0 | 0.02 | 0 | 0.03 | 0.02 |
| $RO/Al_2O_3$ | 1.33 | 1.32 | 1.3 | 1.31 | 1.31 | 1.31 | 1.4 |
| $(RO - Al_2O_3)/(1 - B_2O_3/100)$ | 3.99 | 3.8 | 3.46 | 3.66 | 3.56 | 3.75 | 4.67 |
| $(SiO_2 + Al_2O_3)/(1 - B_2O_3/100)$ | 83.74 | 84.18 | 84.87 | 84.49 | 84.71 | 83.92 | 83.58 |

TABLE 2-continued

|  |  | 1 | 2 | 3 | 4 | 5 | 6 | 7 |
|---|---|---|---|---|---|---|---|---|
|  | MgO/(MgO + CaO + SrO + BaO) | 0.37 | 0.31 | 0.32 | 0.29 | 0.32 | 0.37 | 0.34 |
| Properties |  | 1 | 2 | 3 | 4 | 5 | 6 | 7 |
|  | Strain | 740 | 761 | 742 | 740 | 765 | 764 | 759 |
|  | Anneal | 793 | 818 | 797 | 794 | 820 | 817 | 813 |
|  | Soft (ppv) | 1030.1 | 1059.5 | 1043.6 | 1042.5 |  | 1052.8 | 1052.3 |
|  | CTE (disk) | 36.2 | 36.1 | 35.6 | 35.3 | 36.7 | 35.9 | 36.4 |
|  | Density | 2.595 | 2.604 | 2.575 | 2.586 | 2.611 | 2.601 | 2.629 |
|  | Young's modulus | 12.178 | 12.187 | 11.904 | 11.92 | 12.076 | 12.371 | 12.12 |
|  | specific modulus | 32.4 | 32.3 | 31.9 | 31.8 | 31.9 | 32.8 | 31.8 |
| Viscosity |  | 1 | 2 | 3 | 4 | 5 | 6 | 7 |
|  | A | −3.039 | −3.318 | −3.089 | −2.936 | −3.179 | −2.77 | −3.281 |
|  | B | 6851.7 | 7509.3 | 7314.4 | 6813.9 | 7321.7 | 6440.1 | 7682.3 |
|  | To | 380.6 | 364.2 | 347 | 391.5 | 376.7 | 423.8 | 329.9 |
|  | 200 poise | 1664 | 1701 | 1704 | 1693 | 1713 | 1694 | 1706 |
|  | 400 poise | 1595 | 1633 | 1632 | 1622 | 1643 | 1623 | 1636 |
|  | 35000 poise | 1284 | 1319 | 1305 | 1302 | 1325 | 1304 | 1312 |
| Gradient boat |  | 1 | 2 | 3 | 4 | 5 | 6 | 7 |
|  | internal | 1210 | 1240 | 1225 | 1210 | 1250 | 1220 | 1220 |
|  | internal viscosity | 166737 | 180392.2 | 174482.4 | 244828.8 | 160304.6 | 208231.1 | 223783.5 |
|  | T(35 kp) − T(liq) | 74 | 79 | 80 | 92 | 75 | 84 | 92 |

| mol % | Example | 8 | 9 | 10 | 11 | 12 | 13 |
|---|---|---|---|---|---|---|---|
|  | SiO$_2$ | 71.21 | 72.48 | 71.79 | 71.33 | 71.33 | 73.59 |
|  | Al$_2$O$_3$ | 11.59 | 11.73 | 12.61 | 11.49 | 11.58 | 11.37 |
|  | B$_2$O$_3$ | 1.19 | 0 | 1.72 | 1.29 | 1.53 | 0 |
|  | MgO | 5.32 | 4.95 | 3.94 | 5.21 | 4.65 | 4.73 |
|  | CaO | 5.36 | 5.53 | 5.03 | 5.33 | 5.79 | 5.11 |
|  | SrO | 1.4 | 1.82 | 1.21 | 1.28 | 1.69 | 1.32 |
|  | BaO | 3.78 | 3.31 | 3.54 | 3.91 | 3.24 | 3.74 |
|  | SnO$_2$ | 0.11 | 0.14 | 0.12 | 0.11 | 0.15 | 0.12 |
|  | Fe$_2$O$_3$ | 0.02 | 0.02 | 0.01 | 0.02 | 0.02 | 0.01 |
|  | ZrO$_2$ | 0.02 | 0.02 | 0.02 | 0.02 | 0.02 | 0 |
|  | RO/Al$_2$O$_3$ | 1.37 | 1.33 | 1.09 | 1.37 | 1.33 | 1.31 |
|  | (RO − Al$_2$O$_3$)/(1 − B$_2$O$_3$/100) | 4.32 | 3.88 | 1.13 | 4.3 | 3.85 | 3.53 |
|  | (SiO$_2$ + Al$_2$O$_3$)/(1 − B$_2$O$_3$/100) | 83.8 | 84.21 | 85.88 | 83.9 | 84.2 | 84.96 |
|  | MgO/(MgO + CaO + SrO + BaO) | 0.34 | 0.32 | 0.29 | 0.33 | 0.3 | 0.32 |
| Properties |  | 8 | 9 | 10 | 11 | 12 | 13 |
|  | Strain | 744 | 764 | 752 | 745 | 738 | 765 |
|  | Anneal | 797 | 818 | 806 | 798 | 794 | 821 |
|  | Soft (ppv) | 1038.6 | 1058 |  | 1035.1 | 1037.3 | 1073.1 |
|  | CTE (disk) | 36.5 |  | 35.5 | 33.8 | 36.8 | 35.9 |
|  | Density | 2.612 | 2.611 |  | 2.612 | 2.594 | 2.592 |
|  | Young's modulus | 12.083 | 12.086 |  | 12.003 | 11.932 | 12.011 |
|  | specific modulus | 31.9 | 31.9 |  | 31.7 | 31.7 | 31.9 |
| Viscosity |  | 8 | 9 | 10 | 11 | 12 | 13 |
|  | A | −3.058 | −2.963 | −2.9388 | −3.267 | −3.416 | −3.229 |
|  | B | 7027.4 | 6997.2 | 6854.51 | 7471.1 | 7756.7 | 7499 |
|  | To | 369.3 | 384.4 | 397.06 | 338.2 | 326.9 | 368.2 |
|  | 200 poise | 1681 | 1714 | 1705 | 1680 | 1684 | 1724 |
|  | 400 poise | 1611 | 1642 | 1634 | 1611 | 1616 | 1654 |
|  | 35000 poise | 1294 | 1316 | 1313 | 1295 | 1301 | 1333 |
| Gradient boat |  | 8 | 9 | 10 | 11 | 12 | 13 |
|  | internal | 1190 | 1205 | 1185 | 1185 | 1200 | 1250 |
|  | internal viscosity | 319661.5 | 366379.8 | 576075.1 | 359537.7 | 293826.6 | 188449.9 |
|  | T(35 kp) − T(liq) | 104 | 111 | 128 | 110 | 101 | 83 |

|  | Example | 14 | 15 | 16 | 17 | 18 | 19 |
|---|---|---|---|---|---|---|---|
|  | SiO$_2$ | 72.27 | 73.26 | 71.86 | 72.08 | 72.09 | 72.78 |
|  | Al$_2$O$_3$ | 11.9 | 11.09 | 11.72 | 11.76 | 12.05 | 11.39 |
|  | B$_2$O$_3$ | 0 | 1 | 0 | 0 | 0 | 0 |
|  | MgO | 4.92 | 4.61 | 5.17 | 5.34 | 5.4 | 4.91 |
|  | CaO | 6.16 | 4.98 | 5.59 | 5.44 | 5.38 | 5.44 |
|  | SrO | 2.13 | 1.29 | 1.42 | 1.6 | 2.03 | 1.68 |
|  | BaO | 2.46 | 3.63 | 4.05 | 3.62 | 2.93 | 3.65 |
|  | SnO$_2$ | 0.12 | 0.12 | 0.15 | 0.11 | 0.1 | 0.11 |
|  | Fe$_2$O$_3$ | 0.02 | 0.01 | 0.02 | 0.02 | 0.01 | 0.02 |
|  | ZrO$_2$ | 0.02 | 0 | 0.02 | 0.02 | 0.02 | 0.02 |
|  | RO/Al$_2$O$_3$ | 1.32 | 1.31 | 1.38 | 1.36 | 1.31 | 1.38 |
|  | (RO − Al$_2$O$_3$)/(1 − B$_2$O$_3$/100) | 3.77 | 3.45 | 4.51 | 4.24 | 3.69 | 4.29 |
|  | (SiO$_2$ + Al$_2$O$_3$)/(1 − B$_2$O$_3$/100) | 84.17 | 85.2 | 83.58 | 83.84 | 84.14 | 84.17 |
|  | MgO/(MgO + CaO + SrO + BaO) | 0.31 | 0.32 | 0.32 | 0.33 | 0.34 | 0.31 |
| Properties |  | 14 | 15 | 16 | 17 | 18 | 19 |
|  | Strain | 765 | 749 | 760 | 759 | 762 | 762 |
|  | Anneal | 818 | 806 | 814 | 813 | 816 | 815 |
|  | Soft (ppv) | 1055.3 | 1059.6 | 1052.2 | 1051.4 | 1050 | 1056.8 |

TABLE 2-continued

|  |  | | | | | | |
|---|---|---|---|---|---|---|---|
|  | CTE (disk) | 35.9 | 35.8 | 37.3 | 36.1 | 37.1 | 37.2 |
|  | Density | 2.591 | 2.572 | 2.632 | 2.619 | 2.603 | 2.616 |
|  | Young's modulus | 12.228 | 11.769 |  | 12.158 |  |  |
|  | specific modulus | 32.5 | 31.5 | 0 | 32 |  | 0 |
| Viscosity |  | 14 | 15 | 16 | 17 | 18 | 19 |
|  | A | −3.143 | −3.447 | −3.156 | −3.201 | −3.227 | −2.954 |
|  | B | 7180.4 | 8201 | 7237.7 | 7221.9 | 7345.25 | 7021.4 |
|  | To | 381.1 | 290.5 | 370.5 | 379.5 | 368.95 | 385.6 |
|  | 200 poise | 1700 | 1717 | 1697 | 1692 | 1698 | 1722 |
|  | 400 poise | 1631 | 1646 | 1627 | 1624 | 1629 | 1649 |
|  | 35000 poise | 1315 | 1317 | 1310 | 1312 | 1314 | 1322 |
| Gradient boat |  | 14 | 15 | 16 | 17 | 18 | 19 |
|  | internal | 1240 | 1245 | 1195 | 1200 | 1225 | 1230 |
|  | internal viscosity | 164814.5 | 139615.3 | 419073.2 | 398867 | 225630.8 | 229748.9 |
|  | T(35 kp) - T(liq) | 75 | 72 | 115 | 112 | 89 | 92 |

|  | Example | 20 | 21 | 22 | 23 | 24 | 25 |
|---|---|---|---|---|---|---|---|
|  | $SiO_2$ | 72.19 | 71.45 | 73.18 | 72.39 | 72.65 | 71.59 |
|  | $Al_2O_3$ | 12.2 | 12.05 | 11.95 | 11.74 | 11.72 | 11.73 |
|  | $B_2O_3$ | 1 | 1.25 | 0.5 | 0 | 0 | 1.65 |
|  | MgO | 4.61 | 4.9 | 4.56 | 5.14 | 4.86 | 4.75 |
|  | CaO | 4.9 | 5.5 | 4.88 | 5.34 | 5.59 | 5.5 |
|  | SrO | 1.3 | 1.55 | 1.24 | 1.22 | 2.58 | 2 |
|  | BaO | 3.6 | 3.15 | 3.54 | 4.02 | 2.43 | 2.65 |
|  | $SnO_2$ | 0.16 | 0.12 | 0.13 | 0.11 | 0.12 | 0.12 |
|  | $Fe_2O_3$ | 0.02 | 0.03 | 0.02 | 0.01 | 0.02 | 0.01 |
|  | $ZrO_2$ | 0.02 | 0 | 0 | 0.02 | 0.03 | 0 |
|  | $RO/Al_2O_3$ | 1.18 | 1.25 | 1.19 | 1.34 | 1.32 | 1.27 |
|  | $(RO - Al_2O_3)/(1 - B_2O_3/100)$ | 2.23 | 3.09 | 2.28 | 3.98 | 3.74 | 3.22 |
|  | $(SiO_2 + Al_2O_3)/(1 - B_2O_3/100)$ | 85.24 | 84.56 | 85.56 | 84.13 | 84.37 | 84.72 |
|  | MgO/(MgO + CaO + SrO + BaO) | 0.32 | 0.32 | 0.32 | 0.33 | 0.31 | 0.32 |
| Properties |  | 20 | 21 | 22 | 23 | 24 | 25 |
|  | Strain | 752 | 738 | 767 | 761 | 765 | 743 |
|  | Anneal | 807 | 793 | 821 | 817 | 819 | 797 |
|  | Soft (ppv) | 1050.2 | 1034.2 | 1069.5 | 1060.2 | 1058.6 | 1039.8 |
|  | CTE (disk) | 35.4 | 36.2 | 34.4 | 34 | 36.4 | 35.9 |
|  | Density | 2.603 | 2.603 | 2.577 | 2.62 | 2.594 | 2.574 |
|  | Young's modulus |  | 12.112 | 11.951 | 12.115 | 12.163 | 11.929 |
|  | specific modulus | 0 | 32.1 | 32 | 31.9 | 32.3 | 32 |
| Viscosity |  | 20 | 21 | 22 | 23 | 24 | 25 |
|  | A | −3.232 | −2.868 | −3.354 | −3.061 | −2.77 | −3.044 |
|  | B | 7311.1 | 6597.4 | 7841.5 | 7095.3 | 6633.3 | 7080.4 |
|  | To | 370.6 | 398 | 326.5 | 388.7 | 408.9 | 365.7 |
|  | 200 poise | 1692 | 1674 | 1713 | 1712 | 1717 | 1690 |
|  | 400 poise | 1624 | 1604 | 1643 | 1642 | 1644 | 1620 |
|  | 35000 poise | 1311 | 1288 | 1319 | 1322 | 1316 | 1299 |
| Gradient boat |  | 20 | 21 | 22 | 23 | 24 | 25 |
|  | internal | 1220 | 1205 | 1230 | 1225 | 1240 | 1220 |
|  | internal viscosity | 237339.4 | 202869.5 | 211361.6 | 264945.4 | 162685.9 | 175369.9 |
|  | T(35 kp) - T(liq) | 91 | 83 | 89 | 97 | 76 | 79 |

|  | Example | 26 | 27 | 28 | 29 | 30 | 31 |
|---|---|---|---|---|---|---|---|
|  | $SiO_2$ | 71.71 | 72.7 | 72.21 | 71.14 | 72.85 | 71.97 |
|  | $Al_2O_3$ | 11.24 | 11.38 | 11.62 | 11.27 | 11.37 | 12.02 |
|  | $B_2O_3$ | 0 | 0 | 0 | 0.91 | 0 | 0 |
|  | MgO | 5.95 | 3.88 | 5.24 | 5.68 | 4.85 | 4.98 |
|  | CaO | 5.5 | 5.74 | 5.47 | 5.46 | 5.73 | 6.23 |
|  | SrO | 1.03 | 2.83 | 1.2 | 1.1 | 0.92 | 2.15 |
|  | BaO | 4.38 | 3.31 | 4.09 | 4.27 | 4.13 | 2.49 |
|  | $SnO_2$ | 0.11 | 0.11 | 0.11 | 0.11 | 0.11 | 0.12 |
|  | $Fe_2O_3$ | 0.05 | 0.02 | 0.02 | 0.04 | 0.02 | 0.02 |
|  | $ZrO_2$ | 0.03 | 0.02 | 0.02 | 0.02 | 0.02 | 0.03 |
|  | $RO/Al_2O_3$ | 1.5 | 1.38 | 1.38 | 1.46 | 1.37 | 1.32 |
|  | $(RO - Al_2O_3)/(1 - B_2O_3/100)$ | 5.62 | 4.38 | 4.38 | 5.29 | 4.26 | 3.83 |
|  | $(SiO_2 + Al_2O_3)/(1 - B_2O_3/100)$ | 82.95 | 84.08 | 83.83 | 83.17 | 84.22 | 83.99 |
|  | MgO/(MgO + CaO + SrO + BaO) | 0.35 | 0.25 | 0.33 | 0.34 | 0.31 | 0.31 |
| Properties |  | 26 | 27 | 28 | 29 | 30 | 31 |
|  | Strain | 755 | 761 | 764 | 740 | 760 | 766 |
|  | Anneal | 807 | 816 | 816 | 793 | 814 | 819 |
|  | Soft (ppv) | 1043 | 1056.7 | 1047.7 | 1033.1 | 1058.9 | 1056 |
|  | CTE (disk) |  | 38.2 |  | 37 | 36.2 |  |
|  | Density | 2.637 | 2.627 | 2.625 | 2.629 | 2.618 | 2.593 |
|  | Young's modulus | 12.099 | 12.052 | 12.062 | 11.947 | 12.006 | 12.299 |
|  | specific modulus | 31.6 | 31.6 | 31.7 | 31.3 | 31.6 | 32.7 |

TABLE 2-continued

| | | 26 | 27 | 28 | 29 | 30 | 31 |
|---|---|---|---|---|---|---|---|
| Viscosity | | | | | | | |
| | A | −2.927 | −3.158 | −3.245 | −3 | −2.577 | −3.031 |
| | B | 6767.8 | 7404.8 | 7464.1 | 6922.1 | 6367.7 | 7014.5 |
| | To | 400.7 | 361.3 | 354.3 | 371.5 | 425.3 | 383.8 |
| | 200 poise | 1695 | 1718 | 1700 | 1677 | 1731 | 1699 |
| | 400 poise | 1625 | 1647 | 1631 | 1607 | 1655 | 1629 |
| | 35000 poise | 1307 | 1323 | 1313 | 1289 | 1320 | 1310 |
| Gradient boat | | 26 | 27 | 28 | 29 | 30 | 31 |
| | internal | 1200 | 1230 | 1200 | 1190 | 1210 | 1235 |
| | internal viscosity | 346863.6 | 232274.4 | 381015.8 | 286454.5 | 345001.5 | 162076.1 |
| | T(35 kp) − T(liq) | 107 | 93 | 113 | 99 | 110 | 75 |

| | Example | 32 | 33 | 34 | 35 | 36 | 37 |
|---|---|---|---|---|---|---|---|
| | $SiO_2$ | 71.66 | 70.82 | 72 | 74.05 | 72.8 | 72.83 |
| | $Al_2O_3$ | 12.19 | 12.07 | 11.65 | 12.03 | 11.37 | 11.38 |
| | $B_2O_3$ | 0 | 1 | 1.65 | 0 | 0 | 0 |
| | MgO | 6.22 | 6.01 | 4.75 | 4.34 | 4.29 | 5.38 |
| | CaO | 5.33 | 5.27 | 5.3 | 4.73 | 5.72 | 5.19 |
| | SrO | 2.25 | 2.16 | 1.5 | 1.18 | 2.08 | 0.88 |
| | BaO | 2.18 | 2.5 | 3 | 3.53 | 3.57 | 4.19 |
| | $SnO_2$ | 0.12 | 0.12 | 0.12 | 0.11 | 0.11 | 0.11 |
| | $Fe_2O_3$ | 0.02 | 0.02 | 0.03 | 0.01 | 0.02 | 0.02 |
| | $ZrO_2$ | 0.02 | 0.03 | 0 | 0.02 | 0.02 | 0.02 |
| | $RO/Al_2O_3$ | 1.31 | 1.32 | 1.25 | 1.15 | 1.38 | 1.37 |
| | $(RO − Al_2O_3)/(1 − B_2O_3/100)$ | 3.79 | 3.91 | 2.95 | 1.75 | 4.29 | 4.26 |
| | $(SiO_2 + Al_2O_3)/(1 − B_2O_3/100)$ | 83.85 | 83.73 | 85.05 | 86.08 | 84.17 | 84.21 |
| | MgO/(MgO + CaO + SrO + BaO) | 0.39 | 0.38 | 0.33 | 0.31 | 0.27 | 0.34 |
| Properties | | 32 | 33 | 34 | 35 | 36 | 37 |
| | Strain | 764 | 745 | 740 | 774 | 760 | 761 |
| | Anneal | 816 | 799 | 794 | 830 | 814 | 815 |
| | Soft (ppv) | 1049.4 | 1034 | 1034.9 | 1079 | 1057.4 | 1056.4 |
| | CTE (disk) | 35.9 | 37 | 34.8 | 34.3 | 36.8 | 36.9 |
| | Density | 2.591 | 2.59 | 2.582 | 2.58 | 2.622 | 2.621 |
| | Young's modulus | 12.402 | | 11.99 | 11.981 | | 12.113 |
| | specific modulus | 33 | | 32 | 32 | 0 | 31.9 |
| Viscosity | | 32 | 33 | 34 | 35 | 36 | 37 |
| | A | −3.426 | −3.2055 | −2.778 | −2.998 | −3.145 | −2.35 |
| | B | 7613.4 | 7086.72 | 6477.2 | 7183 | 7387 | 5942.8 |
| | To | 344.8 | 377.78 | 407.6 | 390.8 | 360.1 | 455.9 |
| | 200 poise | 1674 | 1665 | 1683 | 1746 | 1717 | 1734 |
| | 400 poise | 1608 | 1598 | 1612 | 1673 | 1645 | 1656 |
| | 35000 poise | 1300 | 1292 | 1292 | 1343 | 1321 | 1318 |
| Gradient boat | | 32 | 33 | 34 | 35 | 36 | 37 |
| | internal | 1230 | 1215 | 1200 | 1245 | 1210 | 1215 |
| | internal viscosity | 149543.7 | 181587.2 | 248974.3 | 257654.5 | 352055.2 | 301123.4 |
| | T(35 kp) − T(liq) | 70 | 77 | 92 | 98 | 111 | 103 |

| | Example | 38 | 39 | 40 | 41 | 42 | 43 |
|---|---|---|---|---|---|---|---|
| | $SiO_2$ | 71.6 | 72.61 | 72.31 | 71.69 | 72.31 | 71.27 |
| | $Al_2O_3$ | 11.81 | 11.81 | 11.59 | 11.88 | 12.04 | 12.27 |
| | $B_2O_3$ | 0 | 0 | 0 | 0 | 0 | 1.72 |
| | MgO | 5.54 | 4.91 | 4.82 | 5.97 | 4.88 | 4.2 |
| | CaO | 5.49 | 5.3 | 5.95 | 5.39 | 5.38 | 5.34 |
| | SrO | 1.23 | 1.37 | 0.99 | 1.93 | 1.39 | 1.29 |
| | BaO | 4.19 | 3.88 | 4.18 | 2.99 | 3.87 | 3.76 |
| | $SnO_2$ | 0.11 | 0.12 | 0.11 | 0.11 | 0.11 | 0.12 |
| | $Fe_2O_3$ | 0.02 | 0.01 | 0.02 | 0.02 | 0.01 | 0.01 |
| | $ZrO_2$ | 0.02 | 0 | 0.02 | 0.02 | 0 | 0.02 |
| | $RO/Al_2O_3$ | 1.39 | 1.31 | 1.38 | 1.37 | 1.29 | 1.19 |
| | $(RO − Al_2O_3)/(1 − B_2O_3/100)$ | 4.64 | 3.65 | 4.35 | 4.4 | 3.48 | 2.36 |
| | $(SiO_2 + Al_2O_3)/(1 − B_2O_3/100)$ | 83.41 | 84.42 | 83.9 | 83.57 | 84.35 | 85 |
| | MgO/(MgO + CaO + SrO + BaO) | 0.34 | 0.32 | 0.3 | 0.37 | 0.31 | 0.29 |
| Properties | | 38 | 39 | 40 | 41 | 42 | 43 |
| | Strain | 759 | 765 | 759 | 762 | 764 | 741 |
| | Anneal | 811 | 819 | 813 | 814 | 818 | 794 |
| | Soft (ppv) | 1049.2 | 1059.3 | 1055.6 | 1050.6 | | |
| | CTE (disk) | 37.9 | 36.7 | 36.7 | 36.5 | | 36.7 |
| | Density | 2.632 | 2.624 | 2.627 | 2.612 | 2.617 | |
| | Young's modulus | 12.231 | 12.096 | 12.124 | 12.343 | 12.049 | |
| | specific modulus | 32 | 31.8 | 31.8 | 32.6 | 31.7 | |
| Viscosity | | 38 | 39 | 40 | 41 | 42 | 43 |
| | A | −3.603 | −3.326 | −3.147 | −3.062 | −2.976 | −2.8813 |
| | B | 8091.9 | 7540.6 | 7223.2 | 6951.8 | 7088.4 | 6732.21 |
| | To | 319.2 | 361.5 | 376.4 | 388.2 | 371.8 | 389.92 |
| | 200 poise | 1690 | 1702 | 1702 | 1684 | 1715 | 1689 |

TABLE 2-continued

|  |  |  |  |  |  |  |  |
|---|---|---|---|---|---|---|---|
|  | 400 poise | 1623 | 1634 | 1633 | 1616 | 1643 | 1618 |
|  | 35000 poise | 1312 | 1320 | 1316 | 1302 | 1314 | 1297 |
| Gradient boat |  | 38 | 39 | 40 | 41 | 42 | 43 |
|  | internal | 1220 | 1250 | 1200 | 1220 | 1200 | 1185 |
|  | internal viscosity | 239891.6 | 144839.8 | 420026.6 | 197486.7 | 382650.4 | 385510.9 |
|  | T(35 kp) - T(liq) | 92 | 70 | 116 | 82 | 114 | 112 |

|  | Example | 44 | 45 | 46 | 47 | 48 | 49 |
|---|---|---|---|---|---|---|---|
|  | SiO$_2$ | 72.03 | 72.3 | 71.58 | 72.23 | 72.47 | 72.09 |
|  | Al$_2$O$_3$ | 12.77 | 11.58 | 11.7 | 11.62 | 11.54 | 12.05 |
|  | B$_2$O$_3$ | 1.72 | 0 | 1.25 | 0 | 0 | 0 |
|  | MgO | 3.82 | 4.97 | 4.86 | 5.56 | 5.24 | 5.47 |
|  | CaO | 4.89 | 5.68 | 5.26 | 5.27 | 5.35 | 4.66 |
|  | SrO | 1.18 | 1.28 | 1.4 | 0.96 | 0.72 | 1.84 |
|  | BaO | 3.44 | 4.04 | 3.8 | 4.2 | 4.53 | 3.75 |
|  | SnO$_2$ | 0.12 | 0.11 | 0.13 | 0.11 | 0.11 | 0.1 |
|  | Fe$_2$O$_3$ | 0.01 | 0.02 | 0.02 | 0.02 | 0.02 | 0.01 |
|  | ZrO$_2$ | 0.02 | 0.02 | 0 | 0.02 | 0.02 | 0.02 |
|  | RO/Al$_2$O$_3$ | 1.04 | 1.38 | 1.31 | 1.38 | 1.37 | 1.3 |
|  | (RO − Al$_2$O$_3$)/(1 − B$_2$O$_3$/100) | 0.57 | 4.39 | 3.67 | 4.37 | 4.3 | 3.67 |
|  | (SiO$_2$ + Al$_2$O$_3$)/(1 − B$_2$O$_3$/100) | 86.28 | 83.88 | 84.33 | 83.85 | 84.01 | 84.14 |
|  | MgO/(MgO + CaO + SrO + BaO) | 0.29 | 0.31 | 0.32 | 0.35 | 0.33 | 0.35 |
| Properties |  | 44 | 45 | 46 | 47 | 48 | 49 |
|  | Strain | 750 | 762 | 739 | 757 | 761 | 764 |
|  | Anneal | 803 | 816 | 794 | 810 | 814 | 818 |
|  | Soft (ppv) |  | 1055.1 | 1035.4 | 1050.4 | 1057.2 | 1047 |
|  | CTE (disk) | 35.1 | 37.2 | 37.2 | 36.6 | 36.6 | 37.2 |
|  | Density |  | 2.625 | 2.614 | 2.623 | 2.625 | 2.63 |
|  | Young's modulus |  | 12.086 | 11.984 | 12.124 | 12.194 |  |
|  | specific modulus |  | 31.7 | 31.6 | 31.9 | 32 |  |
| Viscosity |  | 44 | 45 | 46 | 47 | 48 | 49 |
|  | A | −3.2039 | −3.224 | −2.978 | −3.099 | −3.327 | −3.085 |
|  | B | 7359.53 | 7477.8 | 6940.6 | 7233.1 | 7780 | 7131.02 |
|  | To | 369.45 | 353.2 | 371.6 | 364.2 | 323.7 | 379.69 |
|  | 200 poise | 1706 | 1707 | 1686 | 1704 | 1706 | 1704 |
|  | 400 poise | 1637 | 1637 | 1615 | 1633 | 1636 | 1634 |
|  | 35000 poise | 1319 | 1316 | 1294 | 1311 | 1312 | 1314 |
| Gradient boat |  | 44 | 45 | 46 | 47 | 48 | 49 |
|  | internal | 1210 | 1200 | 1190 | 1200 | 1200 | 1235 |
|  | internal viscosity | 356215.2 | 404256.1 | 318195.5 | 283651.6 | 355826.3 | 178793.4 |
|  | T(35 kp) - T(liq) | 109 | 116 | 104 | 101 | 112 | 79 |

|  | Example | 50 | 51 | 52 | 53 | 54 | 55 |
|---|---|---|---|---|---|---|---|
|  | SiO$_2$ | 71.99 | 72.8 | 72.66 | 73.6 | 71.99 | 71.7 |
|  | Al$_2$O$_3$ | 12.5 | 11.38 | 11.43 | 11.38 | 11.55 | 12.49 |
|  | B$_2$O$_3$ | 0.5 | 0 | 0 | 0 | 1.64 | 1.25 |
|  | MgO | 4.75 | 5.12 | 5.15 | 4.73 | 4.68 | 4.75 |
|  | CaO | 5.1 | 5.33 | 4.8 | 5.1 | 5.42 | 5 |
|  | SrO | 1.3 | 1.14 | 2.22 | 1.32 | 1.97 | 2.35 |
|  | BaO | 3.7 | 4.08 | 3.58 | 3.74 | 2.61 | 2.25 |
|  | SnO$_2$ | 0.13 | 0.11 | 0.11 | 0.12 | 0.12 | 0.16 |
|  | Fe$_2$O$_3$ | 0.02 | 0.02 | 0.02 | 0.01 | 0.01 | 0.02 |
|  | ZrO$_2$ | 0 | 0.02 | 0.02 | 0 | 0 | 0.03 |
|  | RO/Al$_2$O$_3$ | 1.19 | 1.38 | 1.38 | 1.31 | 1.27 | 1.15 |
|  | (RO − Al$_2$O$_3$)/(1 − B$_2$O$_3$/100) | 2.36 | 4.29 | 4.32 | 3.51 | 3.18 | 1.88 |
|  | (SiO$_2$ + Al$_2$O$_3$)/(1 − B$_2$O$_3$/100) | 84.91 | 84.18 | 84.09 | 84.98 | 84.93 | 85.26 |
|  | MgO/(MgO + CaO + SrO + BaO) | 0.32 | 0.33 | 0.33 | 0.32 | 0.32 | 0.33 |
| Properties |  | 50 | 51 | 52 | 53 | 54 | 55 |
|  | Strain | 762 | 761 | 762 | 765 | 742 | 749 |
|  | Anneal | 817 | 815 | 816 | 819 | 798 | 804 |
|  | Soft (ppv) | 1057.8 | 1058.3 | 1058.2 | 1060.3 | 1042.4 | 1043.7 |
|  | CTE (disk) | 34.9 | 35.5 | 36.9 | 35.8 | 35.1 | 34.2 |
|  | Density | 2.604 | 2.618 | 2.622 | 2.608 | 2.567 | 2.581 |
|  | Young's modulus | 12.12 | 12.03 | 12.099 | 12.025 | 11.921 |  |
|  | specific modulus | 32.1 | 31.7 | 31.8 | 31.8 | 32 | 0 |
| Viscosity |  | 50 | 51 | 52 | 53 | 54 | 55 |
|  | A | −3.098 | −3.374 | −3.181 | −3.449 | −2.907 | −3.169 |
|  | B | 7091.4 | 7781.6 | 7401.1 | 7934.3 | 6863.9 | 7018.1 |
|  | To | 391.2 | 338.5 | 363.3 | 337.7 | 380.6 | 391 |
|  | 200 poise | 1705 | 1710 | 1713 | 1718 | 1699 | 1674 |
|  | 400 poise | 1635 | 1641 | 1643 | 1649 | 1627 | 1607 |
|  | 35000 poise | 1319 | 1321 | 1321 | 1330 | 1302 | 1301 |
| Gradient boat |  | 50 | 51 | 52 | 53 | 54 | 55 |
|  | internal | 1210 | 1215 | 1210 | 1240 | 1230 | 1225 |
|  | internal viscosity | 365361.7 | 319181.5 | 363172.2 | 221012.5 | 149238.4 | 176192.7 |

TABLE 2-continued

|  |  |  |  |  |  |  |  |
|---|---|---|---|---|---|---|---|
|  | T(35 kp) - T(liq) | 109 | 106 | 111 | 90 | 72 | 76 |
|  | Example | 56 | 57 | 58 | 59 | 60 | 61 |
|  | $SiO_2$ | 72.47 | 72.75 | 72.71 | 71.85 | 70.99 | 72.83 |
|  | $Al_2O_3$ | 11.42 | 11.68 | 11.41 | 11.57 | 11.79 | 11.37 |
|  | $B_2O_3$ | 1 | 0 | 0 | 0 | 1.2 | 0 |
|  | MgO | 4.76 | 4.84 | 4.95 | 5.56 | 5.57 | 4.87 |
|  | CaO | 5.13 | 5.08 | 5.45 | 5.49 | 5.36 | 5.53 |
|  | SrO | 1.33 | 3.06 | 1.5 | 1.22 | 1.84 | 0.93 |
|  | BaO | 3.76 | 2.42 | 3.82 | 4.15 | 3.08 | 4.31 |
|  | $SnO_2$ | 0.12 | 0.12 | 0.11 | 0.11 | 0.11 | 0.11 |
|  | $Fe_2O_3$ | 0.01 | 0.02 | 0.02 | 0.02 | 0.02 | 0.02 |
|  | $ZrO_2$ | 0 | 0.02 | 0.02 | 0.02 | 0.03 | 0.02 |
|  | $RO/Al_2O_3$ | 1.31 | 1.32 | 1.38 | 1.42 | 1.34 | 1.38 |
|  | $(RO - Al_2O_3)/(1 - B_2O_3/100)$ | 3.6 | 3.72 | 4.31 | 4.85 | 4.11 | 4.27 |
|  | $(SiO_2 + Al_2O_3)/(1 - B_2O_3/100)$ | 84.74 | 84.43 | 84.12 | 83.42 | 83.79 | 84.2 |
|  | MgO/(MgO + CaO + SrO + BaO) | 0.32 | 0.31 | 0.31 | 0.34 | 0.35 | 0.31 |
| Properties |  | 56 | 57 | 58 | 59 | 60 | 61 |
|  | Strain | 752 | 764 | 759 | 760 | 744 | 760 |
|  | Anneal | 809 | 818 | 814 | 813 | 796 | 814 |
|  | Soft (ppv) | 1058.2 | 1056.5 | 1055.8 | 1052.3 | 1034.1 | 1059.6 |
|  | CTE (disk) | 34.8 | 36.1 | 37.2 | 38.3 | 36.1 | 36.6 |
|  | Density | 2.595 | 2.598 | 2.62 | 2.628 | 2.6 | 2.621 |
|  | Young's modulus | 11.92 | 11.927 | 12.288 | 12.14 | 12.051 | 12.01 |
|  | specific modulus | 31.7 | 31.7 | 32.3 | 31.9 | 32 | 31.6 |
| Viscosity |  | 56 | 57 | 58 | 59 | 60 | 61 |
|  | A | -3.053 | -3.214 | -3.04 | -3.017 | -3.07 | -3.315 |
|  | B | 7293.1 | 7452.5 | 7104.2 | 6965.6 | 7012.4 | 7912.6 |
|  | To | 358.8 | 357.5 | 382.9 | 390.6 | 370.9 | 314.4 |
|  | 200 poise | 1721 | 1709 | 1713 | 1700 | 1676 | 1723 |
|  | 400 poise | 1648 | 1639 | 1642 | 1630 | 1607 | 1652 |
|  | 35000 poise | 1319 | 1318 | 1320 | 1312 | 1292 | 1321 |
| Gradient boat |  | 56 | 57 | 58 | 59 | 60 | 61 |
|  | internal | 1240 | 1235 | 1210 | 1210 | 1195 | 1210 |
|  | internal viscosity | 167235.2 | 190054.2 | 354232.1 | 304687.3 | 274891.6 | 331109 |
|  | T(35 kp) - T(liq) | 79 | 83 | 110 | 102 | 97 | 111 |
|  | Example | 62 | 63 | 64 | 65 | 66 | 67 |
|  | $SiO_2$ | 70.77 | 72.3 | 71.68 | 72.37 | 73.61 | 71.53 |
|  | $Al_2O_3$ | 11.9 | 11.84 | 12.13 | 12.12 | 12.08 | 11.9 |
|  | $B_2O_3$ | 1.06 | 0 | 0 | 0 | 0 | 1.35 |
|  | MgO | 6 | 5.01 | 5.71 | 4.92 | 4.51 | 4.37 |
|  | CaO | 5.34 | 5.58 | 5.63 | 5.66 | 4.85 | 5.36 |
|  | SrO | 1.89 | 2.1 | 2.17 | 2.75 | 1.26 | 1.38 |
|  | BaO | 2.87 | 3.01 | 2.52 | 2.02 | 3.56 | 3.97 |
|  | $SnO_2$ | 0.11 | 0.12 | 0.12 | 0.12 | 0.12 | 0.12 |
|  | $Fe_2O_3$ | 0.03 | 0.02 | 0.02 | 0.02 | 0.01 | 0.01 |
|  | $ZrO_2$ | 0.03 | 0.02 | 0.03 | 0.02 | 0 | 0.01 |
|  | $RO/Al_2O_3$ | 1.35 | 1.33 | 1.32 | 1.27 | 1.17 | 1.27 |
|  | $(RO - Al_2O_3)/(1 - B_2O_3/100)$ | 4.24 | 3.86 | 3.9 | 3.23 | 2.1 | 3.22 |
|  | $(SiO_2 + Al_2O_3)/(1 - B_2O_3/100)$ | 83.56 | 84.14 | 83.81 | 84.49 | 85.69 | 84.57 |
|  | MgO/(MgO + CaO + SrO + BaO) | 0.37 | 0.32 | 0.36 | 0.32 | 0.32 | 0.29 |
| Properties |  | 62 | 63 | 64 | 65 | 66 | 67 |
|  | Strain | 742 | 766 | 758 | 767 | 776 | 745 |
|  | Anneal | 795 | 820 | 815 | 820 | 830 | 800 |
|  | Soft (ppv) | 1029.6 | 1057.6 | 1052.7 | 1059.5 | 1077.1 | 1043.5 |
|  | CTE (disk) | 36.3 | 35.9 | 36.1 | 36 | 35.8 | 37 |
|  | Density | 2.603 | 2.604 | 2.597 | 2.586 | 2.591 | 2.603 |
|  | Young's modulus | 12.136 | 12.137 | 12.308 | 12.258 | 12.165 | 11.92 |
|  | specific modulus | 32.1 | 32.1 | 32.7 | 32.7 | 32.4 | 31.6 |
| Viscosity |  | 62 | 63 | 64 | 65 | 66 | 67 |
|  | A | -3.035 | -2.991 | -3.143 | -3.049 | -3.566 | -2.943 |
|  | B | 6870.8 | 7115.9 | 6986.1 | 7170.6 | 8149.3 | 6909.4 |
|  | To | 379.2 | 368.7 | 398.3 | 370.2 | 334.5 | 379.8 |
|  | 200 poise | 1667 | 1713 | 1682 | 1710 | 1723 | 1697 |
|  | 400 poise | 1598 | 1641 | 1614 | 1639 | 1656 | 1626 |
|  | 35000 poise | 1286 | 1313 | 1307 | 1315 | 1339 | 1303 |
| Gradient boat |  | 62 | 63 | 64 | 65 | 66 | 67 |
|  | internal | 1205 | 1220 | 1220 | 1235 | 1265 | 1190 |
|  | internal viscosity | 192829.9 | 233272.2 | 228564.1 | 174834.9 | 155589.2 | 384607.5 |
|  | T(35 kp) - T(liq) | 81 | 93 | 87 | 80 | 74 | 113 |
|  | Example | 68 | 69 | 70 | 71 | 72 | 73 |
|  | $SiO_2$ | 71.76 | 72.75 | 70.78 | 71.47 | 72.9 | 71.8 |
|  | $Al_2O_3$ | 11.26 | 11.42 | 11.85 | 11.87 | 11.69 | 11.49 |

TABLE 2-continued

|  |  |  |  |  |  |  |  |
|---|---|---|---|---|---|---|---|
|  | B₂O₃ | 0 | 0 | 0.87 | 0 | 0 | 0 |
|  | MgO | 5.34 | 5.07 | 4.97 | 5.54 | 4.83 | 5.61 |
|  | CaO | 5.75 | 5.34 | 5.77 | 5.52 | 5.25 | 5.48 |
|  | SrO | 1.52 | 0.63 | 1.47 | 1.23 | 1.37 | 1.44 |
|  | BaO | 4.18 | 4.63 | 4.12 | 4.2 | 3.83 | 3.98 |
|  | SnO₂ | 0.16 | 0.11 | 0.14 | 0.11 | 0.12 | 0.16 |
|  | Fe₂O₃ | 0.02 | 0.02 | 0.02 | 0.02 | 0.01 | 0.02 |
|  | ZrO₂ | 0.02 | 0.02 | 0.02 | 0.03 | 0 | 0.02 |
|  | RO/Al₂O₃ | 1.49 | 1.37 | 1.38 | 1.39 | 1.31 | 1.44 |
|  | (RO − Al₂O₃)/(1 − B₂O₃/100) | 5.53 | 4.25 | 4.52 | 4.62 | 3.59 | 5.02 |
|  | (SiO₂ + Al₂O₃)/(1 − B₂O₃/100) | 83.02 | 84.17 | 83.36 | 83.34 | 84.59 | 83.29 |
|  | MgO/(MgO + CaO + SrO + BaO) | 0.32 | 0.32 | 0.3 | 0.34 | 0.32 | 0.34 |
| Properties |  | 68 | 69 | 70 | 71 | 72 | 73 |
|  | Strain | 751 | 761 | 742 | 757 | 765 | 755 |
|  | Anneal | 805 | 815 | 797 | 810 | 819 | 808 |
|  | Soft (ppv) | 1046 | 1058.3 | 1040.1 | 1047.9 |  | 1048 |
|  | CTE (disk) | 39.5 | 37.3 | 38.7 | 37.8 | 36.1 | 38.6 |
|  | Density | 2.641 | 2.627 | 2.632 | 2.637 | 2.6 | 2.631 |
|  | Young's modulus |  | 12.013 |  | 12.237 | 12.124 |  |
|  | specific modulus |  | 31.5 |  | 32 | 32.2 |  |
| Viscosity |  | 68 | 69 | 70 | 71 | 72 | 73 |
|  | A | −3.1715 | −2.639 | −2.8291 | −2.87 | −2.887 | −3.2947 |
|  | B | 7306.29 | 6448.7 | 6603.21 | 6677.3 | 6946 | 7613.94 |
|  | To | 355.18 | 421.2 | 398.09 | 404.8 | 391.2 | 333.99 |
|  | 200 poise | 1690 | 1727 | 1685 | 1696 | 1730 | 1695 |
|  | 400 poise | 1621 | 1652 | 1614 | 1625 | 1657 | 1625 |
|  | 35000 poise | 1302 | 1319 | 1294 | 1305 | 1326 | 1305 |
| Gradient boat |  | 68 | 69 | 70 | 71 | 72 | 73 |
|  | internal | 1200 | 1200 | 1180 | 1230 | 1210 | 1210 |
|  | internal viscosity | 299805.3 | 437827.5 | 412928.1 | 166623.1 | 394590 | 249409.6 |
|  | T(35 kp) − T(liq) | 102 | 119 | 114 | 75 | 116 | 95 |

|  | Example | 74 | 75 | 76 | 77 | 78 | 79 |
|---|---|---|---|---|---|---|---|
|  | SiO₂ | 72.39 | 73.19 | 72.74 | 71.85 | 71.4 | 71.79 |
|  | Al₂O₃ | 12.32 | 11.54 | 11.38 | 10.79 | 11.71 | 11.53 |
|  | B₂O₃ | 0.5 | 0 | 0 | 0 | 1.55 | 1.55 |
|  | MgO | 4.68 | 4.81 | 5.18 | 5.44 | 4.86 | 4.8 |
|  | CaO | 5.03 | 5.19 | 5.25 | 5.89 | 5.38 | 5.3 |
|  | SrO | 1.28 | 1.34 | 0.04 | 1.55 | 1.93 | 1.9 |
|  | BaO | 3.65 | 3.79 | 5.26 | 4.27 | 3.05 | 3 |
|  | SnO₂ | 0.13 | 0.12 | 0.11 | 0.16 | 0.12 | 0.12 |
|  | Fe₂O₃ | 0.02 | 0.01 | 0.02 | 0.02 | 0.01 | 0.01 |
|  | ZrO₂ | 0 | 0 | 0.02 | 0.02 | 0 | 0 |
|  | RO/Al₂O₃ | 1.19 | 1.31 | 1.38 | 1.59 | 1.3 | 1.3 |
|  | (RO − Al₂O₃)/(1 − B₂O₃/100) | 2.33 | 3.59 | 4.35 | 6.36 | 3.57 | 3.52 |
|  | (SiO₂ + Al₂O₃)/(1 − B₂O₃/100) | 85.14 | 84.73 | 84.12 | 82.64 | 84.42 | 84.63 |
|  | MgO/(MgO + CaO + SrO + BaO) | 0.32 | 0.32 | 0.33 | 0.32 | 0.32 | 0.32 |
| Properties |  | 74 | 75 | 76 | 77 | 78 | 79 |
|  | Strain | 762 | 770 | 760 | 748 | 743 | 742 |
|  | Anneal | 817 | 822 | 814 | 801 | 797 | 796 |
|  | Soft (ppv) | 1060.3 | 1068.8 | 1058.4 | 1043 | 1040 | 1041.7 |
|  | CTE (disk) | 35.8 | 35.7 | 36.5 | 39.8 | 35.6 | 34.9 |
|  | Density | 2.596 | 2.6 | 2.63 | 2.645 | 2.586 | 2.584 |
|  | Young's modulus | 12.046 | 12.039 | 11.954 |  | 11.937 | 11.918 |
|  | specific modulus | 32 | 31.9 | 31.3 |  | 31.8 | 31.8 |
| Viscosity |  | 74 | 75 | 76 | 77 | 78 | 79 |
|  | A | −3.115 | −3.715 | −3.007 | −3.2794 | −3.16 | −3.089 |
|  | B | 7142 | 8889.8 | 7290.9 | 7568.49 | 7253.8 | 7373 |
|  | To | 393.1 | 251 | 346.7 | 329.91 | 358.9 | 332.6 |
|  | 200 poise | 1712 | 1729 | 1720 | 1686 | 1687 | 1700 |
|  | 400 poise | 1642 | 1658 | 1647 | 1617 | 1618 | 1628 |
|  | 35000 poise | 1326 | 1327 | 1312 | 1297 | 1300 | 1299 |
| Gradient boat |  | 74 | 75 | 76 | 77 | 78 | 79 |
|  | internal | 1230 | 1235 | 1195 | 1205 | 1230 | 1220 |
|  | internal viscosity | 262346.3 | 208617 | 387007 | 234106.4 | 146951 | 165783.7 |
|  | T(35 kp) − T(liq) | 96 | 92 | 117 | 92 | 70 | 79 |

|  | Example | 80 | 81 | 82 | 83 | 84 | 85 |
|---|---|---|---|---|---|---|---|
|  | SiO₂ | 72.18 | 73.58 | 72.47 | 72.1 | 71.96 | 71.97 |
|  | Al₂O₃ | 12.2 | 11.77 | 11.46 | 12.05 | 12.02 | 11.58 |
|  | B₂O₃ | 0 | 0.5 | 0 | 0 | 0 | 0.84 |
|  | MgO | 4.91 | 4.48 | 5.34 | 5.47 | 4.98 | 4.68 |
|  | CaO | 5.52 | 4.81 | 5.3 | 5.16 | 5.23 | 5.47 |
|  | SrO | 2.07 | 1.22 | 0.37 | 1.34 | 2.15 | 1.39 |
|  | BaO | 2.96 | 3.49 | 4.9 | 3.75 | 3.49 | 3.9 |
|  | SnO₂ | 0.12 | 0.13 | 0.11 | 0.1 | 0.12 | 0.14 |

TABLE 2-continued

|  |  |  |  |  |  |  |  |
|---|---|---|---|---|---|---|---|
|  | $Fe_2O_3$ | 0.02 | 0.02 | 0.02 | 0.01 | 0.02 | 0.02 |
|  | $ZrO_2$ | 0.02 | 0 | 0.02 | 0.02 | 0.03 | 0.02 |
|  | $RO/Al_2O_3$ | 1.27 | 1.19 | 1.39 | 1.3 | 1.32 | 1.33 |
|  | $(RO - Al_2O_3)/(1 - B_2O_3/100)$ | 3.26 | 2.24 | 4.45 | 3.67 | 3.83 | 3.89 |
|  | $(SiO_2 + Al_2O_3)/(1 - B_2O_3/100)$ | 84.38 | 85.78 | 83.93 | 84.15 | 83.98 | 84.26 |
|  | MgO/(MgO + CaO + SrO + BaO) | 0.32 | 0.32 | 0.34 | 0.35 | 0.31 | 0.3 |
| Properties |  | 80 | 81 | 82 | 83 | 84 | 85 |
|  | Strain | 767 | 766 | 761 | 764 | 766 | 748 |
|  | Anneal | 821 | 822 | 815 | 817 | 819 | 801 |
|  | Soft (ppv) | 1059 | 1073.2 | 1056.3 | 1046 | 1059.6 | 1050.8 |
|  | CTE (disk) | 35.7 | 33.7 | 37.3 | 37.3 | 37.1 | 38.6 |
|  | Density | 2.599 | 2.577 | 2.62 | 2.613 | 2.616 | 2.613 |
|  | Young's modulus | 12.162 | 11.981 | 11.948 |  | 12.202 |  |
|  | specific modulus | 32.3 | 32.1 | 31.4 |  | 32.2 |  |
| Viscosity |  | 80 | 81 | 82 | 83 | 84 | 85 |
|  | A | −2.943 | −3.293 | −3.344 | −2.967 | −3.087 | −2.6835 |
|  | B | 6934.4 | 7631.6 | 7736.8 | 6855.99 | 7170.9 | 6479.42 |
|  | To | 388.4 | 359.5 | 336.1 | 403.9 | 369.3 | 412.79 |
|  | 200 poise | 1711 | 1724 | 1707 | 1705 | 1700 | 1713 |
|  | 400 poise | 1639 | 1654 | 1637 | 1635 | 1630 | 1639 |
|  | 35000 poise | 1315 | 1333 | 1317 | 1317 | 1309 | 1309 |
| Gradient boat |  | 80 | 81 | 82 | 83 | 84 | 85 |
|  | internal | 1240 | 1245 | 1220 | 1220 | 1220 | 1195 |
|  | internal viscosity | 158412.7 | 211547.4 | 256464 | 271593.3 | 219994.1 | 398087.8 |
|  | T(35 kp) − T(liq) | 75 | 88 | 97 | 97 | 89 | 114 |

|  | Example | 86 | 87 | 88 | 89 | 90 | 91 |
|---|---|---|---|---|---|---|---|
|  | $SiO_2$ | 71.31 | 71.28 | 71.2 | 72.21 | 71.69 | 72.77 |
|  | $Al_2O_3$ | 11.86 | 12.27 | 12.13 | 11.56 | 11.89 | 11.38 |
|  | $B_2O_3$ | 1.35 | 1.72 | 0.5 | 0 | 1.25 | 0 |
|  | MgO | 5.21 | 4.19 | 6.03 | 5.43 | 4.85 | 5.56 |
|  | CaO | 5.35 | 5.34 | 5.28 | 5.36 | 5.11 | 3.86 |
|  | SrO | 2.01 | 1.29 | 2.17 | 0.74 | 1.45 | 3.09 |
|  | BaO | 2.76 | 3.76 | 2.52 | 4.55 | 3.6 | 3.19 |
|  | $SnO_2$ | 0.12 | 0.12 | 0.12 | 0.11 | 0.12 | 0.11 |
|  | $Fe_2O_3$ | 0.02 | 0.02 | 0.02 | 0.02 | 0.03 | 0.02 |
|  | $ZrO_2$ | 0.01 | 0.01 | 0.03 | 0.02 | 0 | 0.02 |
|  | $RO/Al_2O_3$ | 1.29 | 1.19 | 1.32 | 1.39 | 1.26 | 1.38 |
|  | $(RO - Al_2O_3)/(1 - B_2O_3/100)$ | 3.52 | 2.35 | 3.89 | 4.52 | 3.16 | 4.32 |
|  | $(SiO_2 + Al_2O_3)/(1 - B_2O_3/100)$ | 84.31 | 85.01 | 83.75 | 83.77 | 84.64 | 84.15 |
|  | MgO/(MgO + CaO + SrO + BaO) | 0.34 | 0.29 | 0.38 | 0.34 | 0.32 | 0.35 |
| Properties |  | 86 | 87 | 88 | 89 | 90 | 91 |
|  | Strain | 745 | 743 | 750 | 759 | 740 | 762 |
|  | Anneal | 799 | 798 | 804 | 813 | 794 | 816 |
|  | Soft (ppv) | 1039.6 | 1044.9 | 1040 | 1055.3 | 1038.7 | 1059 |
|  | CTE (disk) | 35.7 | 34.8 | 37.7 | 36.2 | 36.2 | 36.3 |
|  | Density | 2.583 | 2.597 | 2.6 | 2.627 | 2.61 | 2.615 |
|  | Young's modulus | 12.246 | 11.874 |  | 12.085 | 12.033 | 12.076 |
|  | specific modulus | 32.7 | 31.5 |  | 31.7 | 31.8 | 31.8 |
| Viscosity |  | 86 | 87 | 88 | 89 | 90 | 91 |
|  | A | −2.812 | −3.025 | −3.1872 | −3.18 | −2.898 | −3.169 |
|  | B | 6516.6 | 7014.5 | 7081.73 | 7409.1 | 6712.1 | 7419 |
|  | To | 413 | 375.5 | 377.63 | 357.2 | 392 | 360 |
|  | 200 poise | 1688 | 1693 | 1668 | 1709 | 1683 | 1716 |
|  | 400 poise | 1617 | 1622 | 1601 | 1639 | 1612 | 1646 |
|  | 35000 poise | 1299 | 1302 | 1294 | 1316 | 1294 | 1322 |
| Gradient boat |  | 86 | 87 | 88 | 89 | 90 | 91 |
|  | internal | 1205 | 1185 | 1210 | 1220 | 1210 | 1225 |
|  | internal viscosity | 260633.5 | 436742.5 | 209272 | 255431.2 | 203002.4 | 255787.1 |
|  | T(35 kp) − T(liq) | 94 | 117 | 84 | 96 | 84 | 97 |

|  | Example | 92 | 93 | 94 | 95 | 96 | 97 |
|---|---|---|---|---|---|---|---|
|  | $SiO_2$ | 72.39 | 71.74 | 71.2 | 73.78 | 71.65 | 72.79 |
|  | $Al_2O_3$ | 11.55 | 11.37 | 11.91 | 11.88 | 12.18 | 12.14 |
|  | $B_2O_3$ | 0 | 0 | 1.65 | 0.63 | 0 | 0.5 |
|  | MgO | 5.05 | 5.83 | 4.81 | 4.3 | 6.07 | 4.62 |
|  | CaO | 5.48 | 5.48 | 5.58 | 4.64 | 5.49 | 4.95 |
|  | SrO | 1.66 | 1.08 | 2.03 | 1.16 | 2.34 | 1.26 |
|  | BaO | 3.72 | 4.32 | 2.69 | 3.46 | 2.11 | 3.59 |
|  | $SnO_2$ | 0.11 | 0.11 | 0.12 | 0.11 | 0.12 | 0.13 |
|  | $Fe_2O_3$ | 0.02 | 0.04 | 0.01 | 0.01 | 0.02 | 0.02 |
|  | $ZrO_2$ | 0.01 | 0.03 | 0 | 0.02 | 0.02 | 0 |
|  | $RO/Al_2O_3$ | 1.38 | 1.47 | 1.27 | 1.14 | 1.31 | 1.19 |
|  | $(RO - Al_2O_3)/(1 - B_2O_3/100)$ | 4.36 | 5.34 | 3.25 | 1.69 | 3.83 | 2.29 |
|  | $(SiO_2 + Al_2O_3)/(1 - B_2O_3/100)$ | 83.94 | 83.11 | 84.5 | 86.2 | 83.83 | 85.36 |

TABLE 2-continued

|  |  | | | | | | |
|---|---|---|---|---|---|---|---|
|  | MgO/(MgO + CaO + SrO + BaO) | 0.32 | 0.35 | 0.32 | 0.32 | 0.38 | 0.32 |
| Properties |  | 92 | 93 | 94 | 95 | 96 | 97 |
|  | Strain | 760 | 753 | 741 | 763 | 765 | 764 |
|  | Anneal | 813 | 806 | 796 | 820 | 817 | 819 |
|  | Soft (ppv) | 1055.4 | 1044.7 | 1039.2 | 1070.2 | 1049.5 | 1062.7 |
|  | CTE (disk) | 36.9 | 37.8 | 36 | 34.3 | 36.1 | 34.9 |
|  | Density | 2.622 | 2.637 | 2.578 | 2.574 | 2.591 | 2.589 |
|  | Young's modulus | 12.164 | 12.119 | 11.97 | 11.988 | 12.446 | 12.04 |
|  | specific modulus | 32 | 31.7 | 32 | 32.1 | 33.1 | 32.1 |
| Viscosity |  | 92 | 93 | 94 | 95 | 96 | 97 |
|  | A | −3.214 | −3.086 | −2.964 | −2.597 | −3.309 | −3.074 |
|  | B | 7473.4 | 7079.3 | 6900.9 | 6453.9 | 7354.2 | 7152.6 |
|  | To | 354.4 | 383.5 | 376.5 | 432.9 | 364.9 | 386.7 |
|  | 200 poise | 1709 | 1698 | 1687 | 1751 | 1676 | 1717 |
|  | 400 poise | 1639 | 1628 | 1616 | 1674 | 1609 | 1647 |
|  | 35000 poise | 1318 | 1311 | 1296 | 1337 | 1301 | 1326 |
| Gradient boat |  | 92 | 93 | 94 | 95 | 96 | 97 |
|  | internal | 1215 | 1210 | 1210 | 1240 | 1225 | 1230 |
|  | internal viscosity | 295081.1 | 301575.6 | 206739.8 | 250845.8 | 174341.6 | 255669.6 |
|  | T(35 kp) − T(liq) | 103 | 101 | 86 | 97 | 76 | 96 |

|  | Example | 98 | 99 | 100 | 101 | 102 | 103 |
|---|---|---|---|---|---|---|---|
|  | SiO$_2$ | 72.33 | 71.5 | 71.5 | 71.06 | 70.87 | 71.13 |
|  | Al$_2$O$_3$ | 11.69 | 11.78 | 11.75 | 11.98 | 11.75 | 11.2 |
|  | B$_2$O$_3$ | 0 | 0.85 | 1.99 | 1.85 | 1.31 | 0.69 |
|  | MgO | 5.26 | 4.77 | 4.2 | 4.45 | 5.53 | 5.84 |
|  | CaO | 5.34 | 5.55 | 5.28 | 5.77 | 5.4 | 5.52 |
|  | SrO | 1.24 | 1.41 | 2.65 | 1.7 | 1.77 | 1.04 |
|  | BaO | 4 | 3.96 | 2.49 | 3.03 | 3.22 | 4.41 |
|  | SnO$_2$ | 0.11 | 0.14 | 0.12 | 0.12 | 0.11 | 0.11 |
|  | Fe$_2$O$_3$ | 0.01 | 0.02 | 0.01 | 0.01 | 0.02 | 0.05 |
|  | ZrO$_2$ | 0.02 | 0.02 | 0.01 | 0.01 | 0.02 | 0.02 |
|  | RO/Al$_2$O$_3$ | 1.36 | 1.33 | 1.24 | 1.25 | 1.35 | 1.5 |
|  | (RO − Al$_2$O$_3$)/(1 − B$_2$O$_3$/100) | 4.15 | 3.94 | 2.93 | 3.03 | 4.23 | 5.65 |
|  | (SiO$_2$ + Al$_2$O$_3$)/(1 − B$_2$O$_3$/100) | 84.02 | 83.99 | 84.94 | 84.61 | 83.72 | 82.9 |
|  | MgO/(MgO + CaO + SrO + BaO) | 0.33 | 0.3 | 0.29 | 0.3 | 0.35 | 0.35 |
| Properties |  | 98 | 99 | 100 | 101 | 102 | 103 |
|  | Strain | 763 | 748 | 737 | 740 | 742 | 741 |
|  | Anneal | 816 | 800 | 793 | 794 | 794 | 793 |
|  | Soft (ppv) | 1056.4 | 1046.7 | 1037.9 | 1037.3 | 1032.8 | 1031.1 |
|  | CTE (disk) | 36.2 | 37.5 | 35.9 | 36 | 35.9 | 34.9 |
|  | Density | 2.621 | 2.62 | 2.574 | 2.58 | 2.601 | 2.633 |
|  | Young's modulus | 12.229 |  | 11.87 | 12.06 | 12.082 | 12.053 |
|  | specific modulus | 32.2 |  | 31.8 | 32.2 | 32 | 31.6 |
| Viscosity |  | 98 | 99 | 100 | 101 | 102 | 103 |
|  | A | −2.965 | −2.7111 | −2.963 | −2.719 | −2.756 | −3.099 |
|  | B | 6904.9 | 6461.74 | 6934 | 6302.2 | 6435.6 | 7055.7 |
|  | To | 402 | 416 | 373.1 | 430.5 | 406.1 | 365.4 |
|  | 200 poise | 1713 | 1705 | 1690 | 1686 | 1679 | 1672 |
|  | 400 poise | 1642 | 1632 | 1619 | 1615 | 1607 | 1603 |
|  | 35000 poise | 1322 | 1307 | 1297 | 1298 | 1288 | 1289 |
| Gradient boat |  | 98 | 99 | 100 | 101 | 102 | 103 |
|  | internal | 1220 | 1190 | 1200 | 1200 | 1190 | 1185 |
|  | internal viscosity | 299362.9 | 433911.6 | 264567.4 | 295796.8 | 284263.2 | 323378.8 |
|  | T(35 kp) − T(liq) | 102 | 117 | 97 | 98 | 98 | 104 |

|  | Example | 104 | 105 | 106 | 107 | 108 | 109 |
|---|---|---|---|---|---|---|---|
|  | SiO$_2$ | 71.52 | 73.74 | 71.43 | 73.55 | 72.18 | 71.34 |
|  | Al$_2$O$_3$ | 12.44 | 11.82 | 11.43 | 11.85 | 11.86 | 10.98 |
|  | B$_2$O$_3$ | 1.72 | 0 | 0 | 0.3 | 0 | 0 |
|  | MgO | 4.08 | 4.54 | 6.1 | 4.5 | 5.52 | 5.56 |
|  | CaO | 5.19 | 4.9 | 5.44 | 4.83 | 5.39 | 5.99 |
|  | SrO | 1.25 | 1.24 | 1.43 | 1.23 | 1.59 | 1.58 |
|  | BaO | 3.65 | 3.62 | 3.96 | 3.59 | 3.3 | 4.35 |
|  | SnO$_2$ | 0.12 | 0.11 | 0.16 | 0.11 | 0.11 | 0.16 |
|  | Fe$_2$O$_3$ | 0.01 | 0.01 | 0.02 | 0.01 | 0.02 | 0.02 |
|  | ZrO$_2$ | 0.02 | 0.02 | 0.02 | 0.02 | 0.02 | 0.02 |
|  | RO/Al$_2$O$_3$ | 1.14 | 1.21 | 1.48 | 1.19 | 1.33 | 1.59 |
|  | (RO − Al$_2$O$_3$)/(1 − B$_2$O$_3$/100) | 1.76 | 2.48 | 5.5 | 2.31 | 3.94 | 6.5 |
|  | (SiO$_2$ + Al$_2$O$_3$)/(1 − B$_2$O$_3$/100) | 85.43 | 85.56 | 82.86 | 85.66 | 84.04 | 82.32 |
|  | MgO/(MgO + CaO + SrO + BaO) | 0.29 | 0.32 | 0.36 | 0.32 | 0.35 | 0.32 |
| Properties |  | 104 | 105 | 106 | 107 | 108 | 109 |
|  | Strain | 745 | 770 | 753 | 768 | 764 | 750 |
|  | Anneal | 798 | 825 | 806 | 823 | 816 | 802 |
|  | Soft (ppv) |  | 1071.1 | 1041 | 1071.7 | 1050.7 | 1039 |

TABLE 2-continued

|  |  | 104 | 105 | 106 | 107 | 108 | 109 |
|---|---|---|---|---|---|---|---|
|  | CTE (disk) | 36.4 | 35.9 | 38.2 | 35.7 | 36.7 | 40.1 |
|  | Density |  | 2.59 | 2.633 | 2.589 | 2.616 | 2.652 |
|  | Young's modulus |  | 12.047 |  | 12.037 | 12.292 |  |
|  | specific modulus |  | 32.1 |  | 32.1 | 32.4 |  |
| Viscosity |  | 104 | 105 | 106 | 107 | 108 | 109 |
|  | A | −3.3669 | −3.093 | −3.1455 | −2.724 | −2.405 | −3.1246 |
|  | B | 7769.3 | 7315.2 | 7160.06 | 6678.5 | 5903.2 | 7195.68 |
|  | To | 322.18 | 375.6 | 372.38 | 418.1 | 457.3 | 356.84 |
|  | 200 poise | 1693 | 1732 | 1687 | 1747 | 1712 | 1683 |
|  | 400 poise | 1624 | 1660 | 1618 | 1672 | 1636 | 1613 |
|  | 35000 poise | 1304 | 1333 | 1304 | 1337 | 1307 | 1295 |
| Gradient boat |  | 104 | 105 | 106 | 107 | 108 | 109 |
|  | internal | 1190 | 1235 | 1200 | 1250 | 1210 | 1190 |
|  | internal viscosity | 385268 | 262412.9 | 320542.7 | 201376.2 | 273967.9 | 325096.6 |
|  | T(35 kp) − T(liq) | 114 | 98 | 104 | 87 | 97 | 105 |

|  | Example | 110 | 111 | 112 | 113 | 114 | 115 |
|---|---|---|---|---|---|---|---|
|  | $SiO_2$ | 72.75 | 73.6 | 72.81 | 72.64 | 72.5 | 71.12 |
|  | $Al_2O_3$ | 11.41 | 11.74 | 11.38 | 11.37 | 11.87 | 11.82 |
|  | $B_2O_3$ | 0 | 0 | 0 | 0 | 0 | 2.01 |
|  | MgO | 4.92 | 4.62 | 4.93 | 5.27 | 4.91 | 4.45 |
|  | CaO | 5.54 | 4.98 | 5.46 | 5.07 | 5.33 | 5.93 |
|  | SrO | 1.17 | 1.29 | 1.37 | 3.3 | 1.39 | 2.25 |
|  | BaO | 4.06 | 3.64 | 3.9 | 2.2 | 3.87 | 2.26 |
|  | $SnO_2$ | 0.11 | 0.12 | 0.11 | 0.11 | 0.12 | 0.12 |
|  | $Fe_2O_3$ | 0.02 | 0.01 | 0.02 | 0.02 | 0.01 | 0.02 |
|  | $ZrO_2$ | 0.02 | 0 | 0.02 | 0.02 | 0 | 0.02 |
|  | $RO/Al_2O_3$ | 1.38 | 1.24 | 1.38 | 1.39 | 1.31 | 1.26 |
|  | $(RO − Al_2O_3)/(1 − B_2O_3/100)$ | 4.28 | 2.79 | 4.28 | 4.47 | 3.63 | 3.13 |
|  | $(SiO_2 + Al_2O_3)/(1 − B_2O_3/100)$ | 84.16 | 85.34 | 84.19 | 84.01 | 84.37 | 84.64 |
|  | MgO/(MgO + CaO + SrO + BaO) | 0.31 | 0.32 | 0.31 | 0.33 | 0.32 | 0.3 |
| Properties |  | 110 | 111 | 112 | 113 | 114 | 115 |
|  | Strain | 760 | 772 | 760 | 760 | 765 | 735 |
|  | Anneal | 814 | 826 | 815 | 815 | 820 | 791 |
|  | Soft (ppv) | 1056.3 | 1071 | 1054.1 | 1056.4 |  | 1033.5 |
|  | CTE (disk) | 36.7 | 35.7 | 36.6 | 36.2 | 36 | 36.3 |
|  | Density | 2.622 | 2.599 | 2.62 | 2.599 | 2.601 | 2.568 |
|  | Young's modulus | 12.073 | 12.095 | 12.127 | 12.228 | 12.146 | 11.956 |
|  | specific modulus | 31.7 | 32.1 | 31.9 | 32.4 | 32.2 | 32.1 |
| Viscosity |  | 110 | 111 | 112 | 113 | 114 | 115 |
|  | A | −3.431 | −3.385 | −2.954 | −3.608 | −3.184 | −3.086 |
|  | B | 7862.3 | 7779.3 | 6950.9 | 8438.4 | 7438.8 | 7014.9 |
|  | To | 335 | 357.4 | 394.2 | 282.4 | 357 | 375.4 |
|  | 200 poise | 1707 | 1726 | 1717 | 1710 | 1713 | 1678 |
|  | 400 poise | 1638 | 1657 | 1645 | 1641 | 1643 | 1609 |
|  | 35000 poise | 1321 | 1339 | 1321 | 1318 | 1320 | 1295 |
| Gradient boat |  | 110 | 111 | 112 | 113 | 114 | 115 |
|  | internal | 1210 | 1250 | 1210 | 1240 | 1210 | 1210 |
|  | internal viscosity | 358497.2 | 213956.8 | 368424.2 | 159966.9 | 344152 | 208499.1 |
|  | T(35 kp) − T(liq) | 111 | 89 | 111 | 78 | 110 | 85 |

|  | Example | 116 | 117 | 118 | 119 | 120 | 121 |
|---|---|---|---|---|---|---|---|
|  | $SiO_2$ | 72.29 | 72.71 | 71.88 | 71.32 | 72.33 | 71.88 |
|  | $Al_2O_3$ | 11.87 | 11.48 | 11.47 | 11.64 | 11.55 | 11.97 |
|  | $B_2O_3$ | 0 | 0 | 0 | 0.85 | 0 | 0 |
|  | MgO | 4.92 | 4.95 | 5.66 | 4.87 | 5.05 | 5.74 |
|  | CaO | 5.67 | 5.39 | 5.46 | 5.67 | 5.49 | 5.36 |
|  | SrO | 2.62 | 1.46 | 1.12 | 1.44 | 1.52 | 1.89 |
|  | BaO | 2.46 | 3.82 | 4.24 | 4.05 | 3.9 | 3 |
|  | $SnO_2$ | 0.12 | 0.15 | 0.11 | 0.14 | 0.11 | 0.11 |
|  | $Fe_2O_3$ | 0.02 | 0.02 | 0.03 | 0.01 | 0.02 | 0.02 |
|  | $ZrO_2$ | 0.03 | 0.02 | 0.02 | 0 | 0.02 | 0.02 |
|  | $RO/Al_2O_3$ | 1.32 | 1.36 | 1.44 | 1.38 | 1.38 | 1.34 |
|  | $(RO − Al_2O_3)/(1 − B_2O_3/100)$ | 3.8 | 4.14 | 5.01 | 4.43 | 4.41 | 4.02 |
|  | $(SiO_2 + Al_2O_3)/(1 − B_2O_3/100)$ | 84.16 | 84.19 | 83.35 | 83.67 | 83.88 | 83.85 |
|  | MgO/(MgO + CaO + SrO + BaO) | 0.31 | 0.32 | 0.34 | 0.3 | 0.32 | 0.36 |
| Properties |  | 116 | 117 | 118 | 119 | 120 | 121 |
|  | Strain | 763 | 763 | 757 | 744 | 763 | 762 |
|  | Anneal | 818 | 817 | 810 | 798 | 814 | 814 |
|  | Soft (ppv) | 1057.3 | 1055.8 | 1049.1 | 1042.4 | 1055.7 | 1051.6 |
|  | CTE (disk) | 36 | 36.6 | 38.3 | 38.4 | 37.2 | 35.7 |
|  | Density | 2.598 | 2.613 | 2.634 | 2.624 | 2.623 | 2.608 |
|  | Young's modulus | 12.197 | 12.08 | 12.094 |  | 12.118 | 12.297 |
|  | specific modulus | 32.4 | 31.9 | 31.7 |  | 31.9 | 32.5 |

TABLE 2-continued

| Viscosity | | 116 | 117 | 118 | 119 | 120 | 121 |
|---|---|---|---|---|---|---|---|
| | A | −2.921 | −3.036 | −3.121 | −2.745 | −3.031 | −2.606 |
| | B | 6826.5 | 7156.8 | 7213.1 | 6495.63 | 7108.6 | 6152.6 |
| | To | 395.7 | 373.8 | 367.2 | 406.26 | 378.9 | 446 |
| | 200 poise | 1703 | 1715 | 1698 | 1694 | 1712 | 1700 |
| | 400 poise | 1632 | 1643 | 1628 | 1621 | 1641 | 1627 |
| | 35000 poise | 1310 | 1318 | 1308 | 1297 | 1317 | 1306 |
| Gradient boat | | 116 | 117 | 118 | 119 | 120 | 121 |
| | internal | 1240 | 1210 | 1220 | 1185 | 1200 | 1225 |
| | internal viscosity | 146014.6 | 333210 | 217339.1 | 394643.6 | 423068.6 | 195918.1 |
| | T(35 kp) − T(liq) | 70 | 108 | 88 | 112 | 117 | 81 |

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed is:

1. A glass comprising in mol percent on an oxide basis:

$70 \leq SiO_2 \leq 74.5$ $10.5 \leq Al_2O_3 \leq 13.5$ $0 \leq B_2O_3 \leq 2.5$ $3 \leq MgO \leq 7$ $3 \leq CaO \leq 7$ $0 \leq SrO \leq 4$ $1.5 \leq BaO \leq 6$ $0 \leq SnO_2 \leq 0.3$ $0 \leq CeO_2 \leq 0.3$ $0 \leq As_2O_3 \leq 0.5$ $0.01 \leq Fe_2O_3 \leq 0.08$ $F+Cl+Br \leq 0.4$ wherein $(SiO_2+Al_2O_3)/(1-B_2O_3/100)=86.97-0.713*(RO-Al_2O_3)/(1-B_2O_3/100)\pm 0.8$ where:
(i) $RO=MgO+CaO+SrO+BaO$, and
(ii) $SiO_2$, $Al_2O_3$, $B_2O_3$, MgO, CaO, SrO and BaO represent the mol percents of the representative oxide components.

2. The glass of claim 1 wherein the glass has an anneal point greater than 785° C.

3. The glass of claim 1 wherein the glass has an anneal point greater than 800° C.

4. The glass of claim 1 wherein the glass comprises less than 0.05% by weight of $As_2O_3$, $Sb_2O_3$ or combinations thereof.

5. The glass of claim 1 wherein the glass comprises less than 0.02% by weight of F, Cl, Br or combinations thereof.

6. The glass of claim 1 wherein the glass comprises less than about 1000 ppm of alkali oxides.

7. The glass of claim 1 wherein the glass comprises up to about 500 ppm $ZrO_2$.

8. The glass of claim 1 wherein $0.29 \leq MgO/RO \leq 0.39$.

9. The glass of claim 1 wherein in mol percent on an oxide basis the glass satisfies the relationship:

$0 \leq B_2O_3 \leq 1.0$.

10. The glass of claim 1 wherein in mol percent on an oxide basis the glass satisfies the relationship:

$0 \leq B_2O_3 \leq 0.5$.

11. The glass of claim 1 wherein the glass is essentially free of $B_2O_3$.

12. The glass of claim 1 wherein $1.05 \leq RO/Al_2O_3 \leq 1.7$.

13. The glass of claim 1 wherein $0.2 \leq MgO/RO \leq 0.45$.

14. A glass comprising in mol percent on an oxide basis:

$70 \leq SiO_2 \leq 74.5$ $10.5 \leq Al_2O_3 \leq 13.5$ $3 \leq MgO \leq 7$ $3 \leq CaO \leq 7$ $0 \leq SrO \leq 4$ $1.5 \leq BaO \leq 6$ $0 \leq SnO_2 \leq 0.3$ $0 \leq CeO_2 \leq 0.3$ $0 \leq As_2O_3 \leq 0.5$ $0 \leq Sb_2O_3 \leq 0.5$ $0.01 \leq Fe_2O_3 \leq 0.08$ $F+Cl+Br \leq 0.4$ wherein
(a) $1.05 \leq RO/Al_2O_3 \leq 1.7$;
(b) $0.2 \leq MgO/RO \leq 0.45$; and
(c) the glass is boron free;

where:
(i) $RO=MgO+CaO+SrO+BaO$, and
(ii) $SiO_2$, $Al_2O_3$, $B_2O_3$, MgO, CaO, SrO and BaO represent the mol percents of the representative oxide components.

15. The glass of claim 14 wherein the glass comprises less than 0.05% by weight of $As_2O_3$, $Sb_2O_3$ or combinations thereof.

16. The glass of claim 14 wherein the glass comprises less than about 1000 ppm of alkali oxides.

17. The glass of claim 14 wherein the glass comprises up to about 500 ppm $ZrO_2$.

18. The glass of claim 14 wherein $$0.29 \leq MgO/RO \leq 0.39.$$

19. The glass of claim 14 wherein:

$$(SiO_2+Al_2O_3)/(1-B_2O_3/100)=86.97-0.713*(RO-Al_2O_3)/(1-B_2O_3/100)\pm 0.8.$$

20. The glass of claim 14 wherein the glass has a liquidus viscosity of at least 130,000 poise.

* * * * *